US012130874B2

(12) United States Patent
Khanna et al.

(10) Patent No.: US 12,130,874 B2
(45) Date of Patent: Oct. 29, 2024

(54) PRESENTING A LEARNING MODULE TO A PATIENT BASED ON SENSOR VALUES AND SURVEY RESPONSES

(71) Applicant: ACTO Technologies Inc., Toronto (CA)

(72) Inventors: Parth Khanna, Toronto (CA); Nick Diamond, Toronto (CA); Kumar Karthik Erramilli, Scarborough (CA)

(73) Assignee: ACTO Technologies Inc., Toronto (CA)

( * ) Notice: Subject to any disclaimer, the term of this patent is extended or adjusted under 35 U.S.C. 154(b) by 0 days.

(21) Appl. No.: 17/961,095

(22) Filed: Oct. 6, 2022

(65) Prior Publication Data
US 2023/0078973 A1    Mar. 16, 2023

Related U.S. Application Data

(63) Continuation of application No. 16/700,004, filed on Dec. 2, 2019, now Pat. No. 11,487,833, which is a continuation of application No. 15/065,099, filed on Mar. 9, 2016, now Pat. No. 10,496,719.

(51) Int. Cl.
*G06F 17/30* (2006.01)
*G06F 16/9535* (2019.01)

(52) U.S. Cl.
CPC ............... *G06F 16/9535* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 9,516,662 | B1* | 12/2016 | Felch ................. G06K 7/10366 |
| 9,721,035 | B2 | 8/2017 | Fink et al. |
| 9,833,199 | B2 | 12/2017 | Johnson et al. |
| 2011/0213435 | A1* | 9/2011 | Rom ...................... G06N 20/00 607/17 |
| 2012/0016435 | A1* | 1/2012 | Rom .................. A61N 1/36082 607/45 |
| 2012/0197911 | A1* | 8/2012 | Banka .................... G06F 16/951 707/754 |
| 2012/0197998 | A1 | 8/2012 | Kessel et al. |
| 2012/0254934 | A1* | 10/2012 | Mcbrearty ............. G16H 20/30 340/870.11 |
| 2013/0036191 | A1 | 2/2013 | Fink et al. |
| 2014/0258285 | A1 | 9/2014 | Lavine et al. |
| 2014/0304632 | A1 | 10/2014 | Ryu et al. |
| 2014/0361906 | A1 | 12/2014 | Hughes et al. |
| 2015/0039731 | A1 | 2/2015 | Madani et al. |
| 2015/0112836 | A1 | 4/2015 | Godsey et al. |

(Continued)

*Primary Examiner* — Hung D Le
(74) *Attorney, Agent, or Firm* — Fernando & Partners, LLP

(57) ABSTRACT

A device receives a request to display a learning module. The device receives sensor values from a set of one or more sensor devices attached to a patient. The device displays a set of survey questions. The device receives user-specified responses to the set of survey questions. The device selects a first learning module from a plurality of learning modules based on the sensor values and the user-specified responses to the set of survey questions. The device displays the first learning module on the display in response to receiving the request to displaying the learning module.

20 Claims, 9 Drawing Sheets

(56) References Cited

U.S. PATENT DOCUMENTS

| | | | |
|---|---|---|---|
| 2015/0253334 A1* | 9/2015 | Johnson | G16H 40/67 |
| | | | 702/182 |
| 2015/0268929 A1 | 9/2015 | Abraham et al. | |
| 2015/0294370 A1* | 10/2015 | Nagarajayya | G06Q 30/0275 |
| | | | 705/14.66 |
| 2016/0129186 A1* | 5/2016 | Douglas | A61H 9/0085 |
| | | | 601/84 |
| 2016/0270338 A1 | 9/2016 | Cole et al. | |
| 2016/0324488 A1* | 11/2016 | Olsen | G16H 15/00 |
| 2017/0026345 A1* | 1/2017 | Salek | H04W 12/033 |
| 2017/0091871 A1* | 3/2017 | Trainor | G08B 21/182 |
| 2017/0123824 A1* | 5/2017 | Franck | G10L 17/08 |
| 2023/0342024 A1* | 10/2023 | Ku | G06T 19/006 |

* cited by examiner

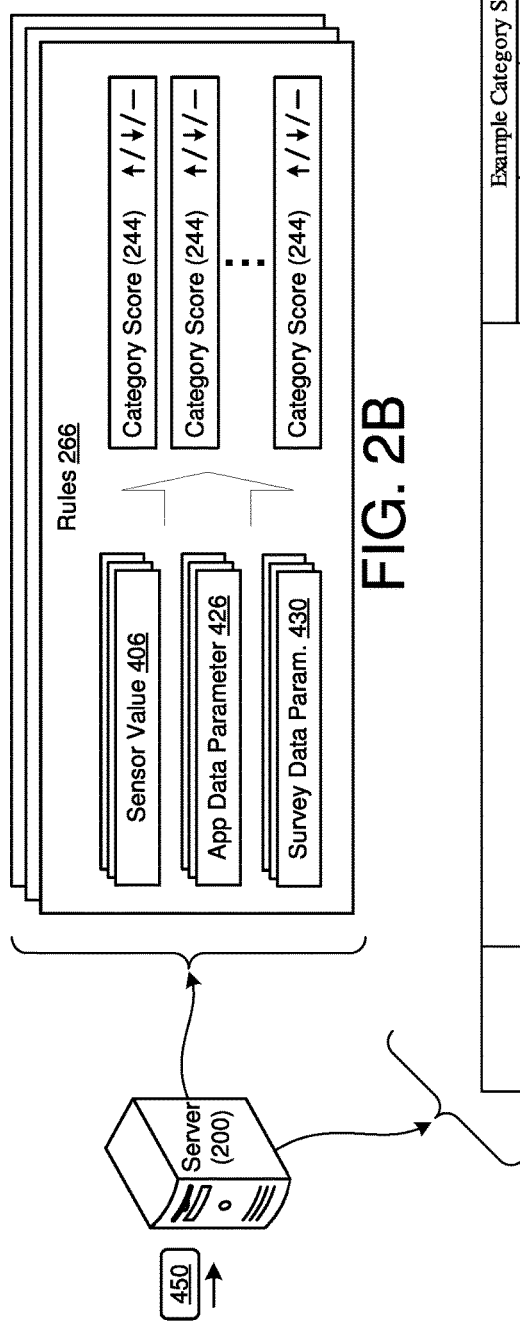

FIG. 2B

| Source | | Rule (266) | Example Category Scores (244) | | | |
|---|---|---|---|---|---|---|
| | | | Cognitively Demanding (244-1) | Creative (244-2) | Mnemonic (244-3) | Rote/Routine (244-4) |
| Neuro Device (20-1) | 266-1 | Global Oscillatory Power = 2-8 Hz (Theta) | 1 | 0 | 1 | 0 |
| | 266-2 | Global Oscillatory Power = 8-13 Hz (Alpha) | -1 | 1 | -1 | 0 |
| | 266-3 | Global Oscillatory Power = 13-30 Hz (Beta) | 1 | -1 | 0 | 1 |
| HRM (20-2) WCD (20-5) | 266-4 | Avg. Heart Rate > 120 bpm for last 30 min. | 0 | 0 | 1 | -1 |
| Contextual Data (456) | 266-5 | Local Time = 5 am - 11 am AND Age > 40 yrs | 1 | 0 | 1 | -1 |
| | 266-6 | Local Time = 7 pm - 11 pm AND Age > 40 yr | -1 | 1 | 0 | 1 |
| | 266-7 | Local Time = 5 am - 11 am AND Age < 40 yrs | -1 | 1 | -1 | 0 |
| | 266-8 | Local Time = 11 pm - 3 am AND Age < 40 yrs | 1 | 0 | 1 | 0 |
| Calendar Application | 266-9 | Current Time - Start Time of Next Event < 10 min | -1 | -1 | 0 | 1 |
| | 266-10 | Current Time - Start Time of Next Event > 10 min | 1 | 1 | 1 | 0 |

DISPLAY A LIST OF DATA ITEMS AT A MOBILE COMPUTING DEVICE 710

-Receive a user selection of an icon for a data item managing application (e.g., task mgmt. app) (712)
-Launch the data item managing application (714)
-Display the data items via a GUI of the data item managing application (716)

↓

DETECT A TRIGGER TO RE-ORDER THE DATA ITEMS IN THE LIST 720

| -Receive a user input to re-order the data items (722) | And /Or | -Re-order the data items upon launching the app (724) | And /Or | -Re-order the data items periodically (726) |

↓

CAPTURE CONTEXTUAL DATA THAT INDICATES A CONTEXT OF THE MOBILE DEVICE 730

| 732 | | 734 | | 736 |
| -Receive sensor data via short-range comm. (732-1) -Record sensor data from on-device sensors (732-2) | And /Or | -Utilize APIs to retrieve app data (734-1) -Receive app data from apps (734-2) | And /Or | -Display one of more survey questions (736-1) -Receive responses to surveys (736-2) |

↓

GENERATE A REQUEST TO RE-ORDER THE DATA ITEMS 740

-Instantiate a data container (742)
-Write the contextual data to the data container (744)
-Write a user ID and/or a device to the data container (746)
-Write information regarding the data items to the data container (748)

↓

TRANSMIT THE REQUEST FOR RE-ORDERING THE DATA ITEMS 750

↓

RECEIVE A DISPLAY ORDER FOR THE DATA ITEMS (E.G., RECEIVE AN ORDERED LIST OF THE DATA ITEMS) 760

-Receive a data container that specifies information regarding data items (762)
-Receive, in the data container, a score for each data item (764)

↓

RE-ARRANGE THE DISPLAY OF THE DATA ITEMS BASED ON THE DISPLAY ORDER INDICATED IN THE ORDERED LIST 770

-Re-arrange the data items to display the data items based on descending scores (772)
-If multiple data items have the same score, arrange those data items based on (774):
   -time duration (774-1)   -size of data item (774-2)   -length of a string in the data item (774-3)
   -calendar availability (774-4)

FIG. 7

PRESENTING A LEARNING MODULE TO A PATIENT BASED ON SENSOR VALUES AND SURVEY RESPONSES

CROSS-REFERENCE TO RELATED APPLICATIONS

This application is a continuation application of and claims priority to U.S. application Ser. No. 16/700,004, filed on Dec. 2, 2019, which is a continuation of U.S. application Ser. No. 15/065,099, filed on Mar. 9, 2016, which are incorporated in their entirety by this reference.

TECHNICAL FIELD

This disclosure relates to determining the display order of data items that are displayed at a computing device based on contextual data that is captured by sensor devices.

BACKGROUND

Computing devices can download, install and execute various applications. An application that can be downloaded and installed at a mobile computing device may be referred to as a native application. Some applications allow a user of the mobile computing device to manage a list of data items. In some scenarios, the data items may correspond with tasks on a to-do list. In such scenarios, a task management application can display the data items. In some examples, the data items may correspond with various multimedia content such as videos, podcasts, etc. In such examples, a learning management application can manage the data items. There may be a need to determine the display order of the data items as the number of data items increases.

SUMMARY

One aspect of the disclosure provides a server. The server may include a network communication device, a storage device, and a processing device. The storage device may include a data item data store, a user information data store, and a scoring data store. The data item data store can store data item records that correspond with data items. A data item record may include a record identifier (ID) that identifies the data item record, information related to the corresponding data item, and a category associated with the corresponding data item. The user information data store may store user IDs that identify users, each user ID being associated with one or more record IDs. The scoring data store stores a scoring model that utilizes one or more rules to score the categories associated with the data items.

The processing device executes computer-readable instructions that, when executed by the processing device, cause the processing device to receive a request for an ordered list of data items. The request may include a user identifier (ID) and contextual data parameters that indicate a context of a mobile computing device. The processing device can query the user information data store with the user ID specified in the request and receive record IDs for data item records that are associated with the user ID specified in the request. For each data item record that is associated with the user ID specified in the request, the processing device can determine the category associated with the corresponding data item. The processing device can determine, based on the scoring model and the contextual data parameters specified in the request, category scores for the categories associated with the request. The processing device generates the ordered list of data items based on the category scores, the ordered list comprises the information related to each data item that is associated with the request and the category score for the category associated with each data item. The processing device transmits the ordered list of data items via the network communication device.

Another aspect of the disclosure provides a computing device (e.g., a mobile computing device). The computing device may include a touchscreen display, one or more sensors, a memory that stores one or more native applications that are installed at the computing device, and a computing processor. The computing device may include a short-range communications interface, one or more on-die sensors, a sensor hub that manages the one or more sensors and the one or more on-die sensors, a transceiver, and one or more central processing units (CPUs).

The one or more CPUs may execute computer-readable instructions that, when executed by the one or more CPUs, cause the one or more CPUs to display a list of data items via the touchscreen display. Each data item may include a text string, an image, a video and/or a link that can launch one of the native applications. The one or more CPUs can detect a trigger to re-order the data items in the list. The one or more CPUs can capture contextual data that indicates a context of the mobile computing device. The contextual data may include sensor measurements. The one or more CPUs may instruct the one or more sensors to record the sensor measurements. The one or more CPUs may instruct the one or more on-die sensors to record the sensor measurements. The one or more CPUs may receive the sensor measurements via the short-range communications interface. The one or more CPUs can generate a request to re-order the data items in the list upon detecting the trigger. The request may include the contextual data and the data item identifiers (IDs) that identify the data items. The one or more CPUs can transmit the request via the transceiver. In response to transmitting the request, the one or more CPUs can receive an ordered list of data items. The ordered list may specify the data item IDs and a rank for each data item ID. The one or more CPUs can re-arrange the display order of the data items based on the ranks of the data items.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2B-C are diagrams that illustrate example rules that the server may utilize to determine the display order for the data items.

FIG. 7 is a block diagram of an example method that the mobile computing device can execute to adjust the display order of data items in a list of data items.

Like reference symbols in the various drawings indicate like elements.

DETAILED DESCRIPTION

Figure 1:
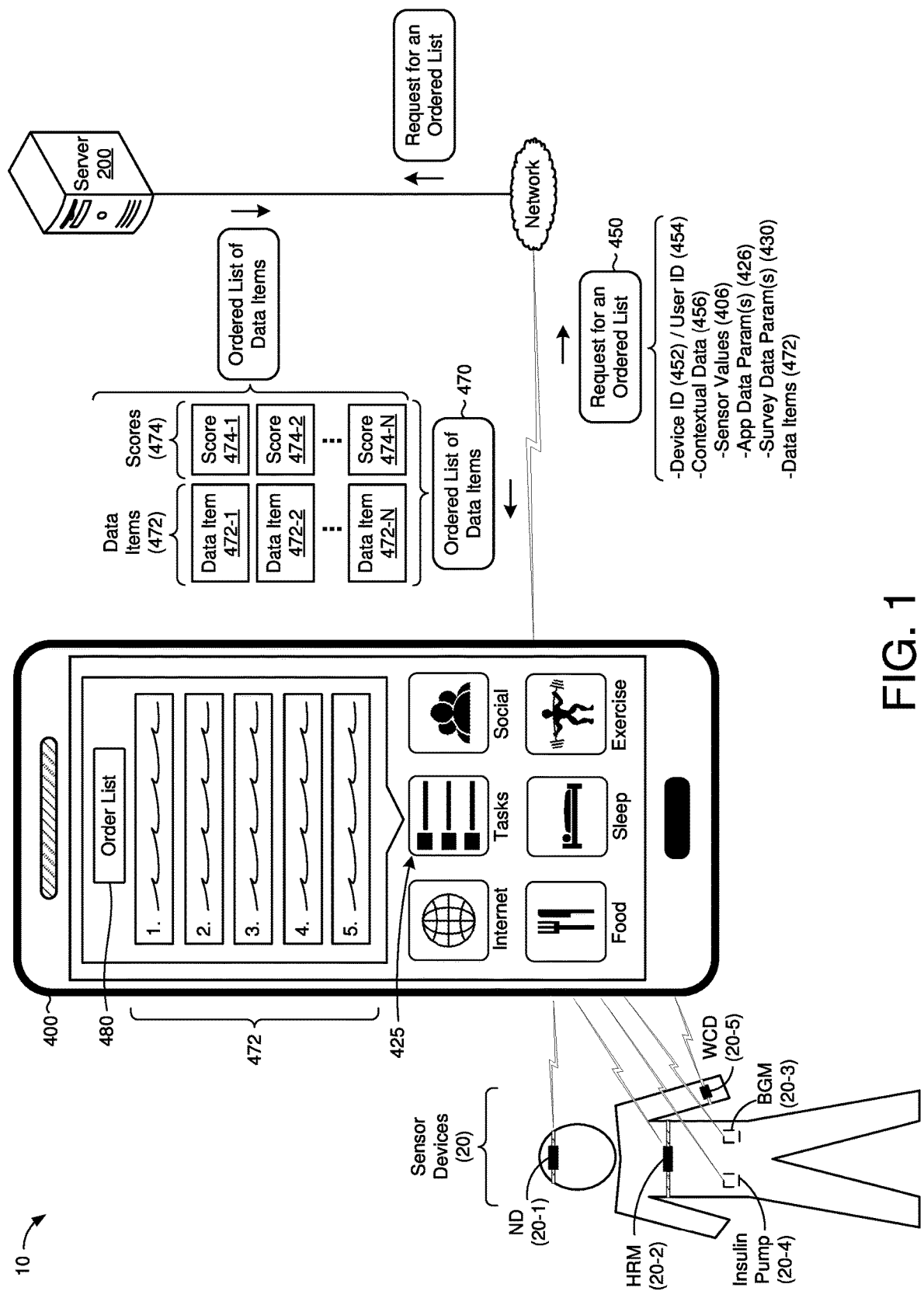
FIG. 1 is a schematic diagram of a system that determines the display order of data items based on contextual data.

The present disclosure relates to determining the display order of data items on a computing device (e.g., a mobile computing device). Determining the display order of the data items may include adjusting (e.g., modifying) a current display order, for example, by re-arranging the data items. A data item may include a text string, an image, a video, and/or a user-selectable link. The mobile computing device may include a data item managing application that manages the data items. In some examples, the data items may be referred to as tasks and the data item managing application may be referred to as a task management application (e.g., a to-do list). In some examples, the data items may be referred to as learning modules and the data item managing application may be referred to as a learning management application. In such examples, the learning management application can receive the learning modules from a server, and present the learning modules to a user of the mobile computing device. In some examples, the data items may be referred to as projects and the data item management application may be referred to as a project management application.

The mobile computing device can automatically adjust the display order of the data items based on contextual data. The contextual data may include sensor measurements that the mobile computing device can receive from other electronic devices (e.g., via short-range communications such as Bluetooth or Wi-Fi, or long-range communications such as cellular communications, the Internet, etc.). For example, the contextual data may include a heart rate measurement from a wireless heart rate monitor and/or a wearable computing device. Similarly, the contextual data may include a blood glucose level from a blood glucose monitor. The contextual data can also include information that is stored in other applications that are installed on the mobile computing device. For example, the contextual data may include information regarding calendar events from a calendar application. Similarly, the contextual data may include a time at which the user of the mobile computing device used a social networking application or a messaging application. The contextual data can also include user-specified responses to survey questions (e.g., a time at which the user consumed coffee).

Each data item may be associated with a category. Example categories for the data items may include cognitively demanding, creative, mnemonic, and rote. Other categories are also contemplated. For example, each data item may be associated with a different category. Data items that are in the cognitively demanding category may involve a high degree of cognition. In other words, interacting with data items that are in the cognitively demanding category may require the user of the mobile computing device to acquire the information stored in the data item, and understand the information through thought, experience and the senses. Interacting with data items in the creative category may require a certain amount of creativity. In other words, viewing or acting upon creative data items may involve imagination or original ideas. Interacting with data items in the mnemonic category may involve remembering or memorizing information. Lastly, interacting with data items in the rote category may involve repetition of habitual tasks.

At a given time, data items in a particular category may be more relevant than data items in other categories based on the contextual data. Accordingly, the mobile computing device can automatically re-arrange the data items based on the contextual data, so that the more relevant data items are displayed towards the top of the list and the less relevant data items are displayed towards the bottom of the list. For example, the contextual data may indicate that the user has exercised. In this example, the user may be more effective at performing mnemonic tasks than rote tasks. Accordingly, the mobile computing device can re-arrange the display order of the data items, so that data items in the mnemonic category are displayed above data items in the rote category. Similarly, if the contextual data indicates that the user recently had a high dosage of a stimulant (e.g., caffeine), then the user may be more effective at performing cognitively demanding tasks than mnemonic tasks. In this example, the mobile computing device can re-arrange the display order of the data items, so that data items in the cognitively demanding category are displayed above data items in the mnemonic category.

FIG. 1 illustrates an example system 10 that may be used to determine the display order of data items 472 at a mobile computing device 400. The system 10 includes the mobile computing device 400 and a server 200. The mobile computing device 400 and the server 200 may communicate via a network. The system 10 may also include various sensor devices 20 that can record sensor measurements. The sensor devices 20 may transmit the sensor measurements to the mobile computing device 400. Examples of the sensor devices 20 include a neuro device 20-1, a heart rate monitor 20-2, a blood glucose monitor 20-3, an insulin pump 20-4, and a wearable computing device 20-5. In the example of FIG. 1, the sensor devices 20 communicate sensor measurements via short-range communications (e.g., Bluetooth, Wi-Fi, etc.). Alternatively or additionally, the sensor devices 20 may communicate sensor measurements via long-range communications (e.g., cellular communications, the Internet, etc.).

The mobile computing device 400 can download, install and execute software applications. Software applications that are installed at the mobile computing device 400 may be referred to as native applications. One of the native applications may include an application that manages the data items 472. Such an application may be referred to as a data item managing application. In some implementations, the data items 472 may be referred to as tasks, and the data item managing application may be referred to as task management application (e.g., a to-do list application, or a reminders application). As illustrated in FIG. 1, the mobile computing device 400 can display an icon 425 for the data item managing application. In this example, the icon 425 for the data item managing application includes the word "Tasks" as an icon caption. Upon detecting a user selection of the icon 425, the mobile computing device 400 can launch the data item managing application, and display the data items 472.

The mobile computing device 400 can generate a request 450 to re-order the data items 472. The request 450 may include a device identifier (ID) 452 and/or a user ID 454. The device ID 452 may include a string that identifies the mobile computing device 400 (e.g., an Internet Protocol (IP) address, a Media Access Control (MAC) address, a Subscriber Identity Module (SIM) number, an International Mobile Equipment Identity (IMEI), etc.). The user ID 454 may include a string that identifies a user of the mobile computing device 400 (e.g., a username, an email address, etc.). The request 450 may include contextual data 456. The contextual data 456 may indicate a context of the mobile computing device 400. The contextual data may include sensor values 406, application data parameters 426, and survey data parameters 430. The sensor values 406 may include sensor measurements that the mobile computing device 400 receives from the sensor devices 20. The sensor values 406 can also include sensor measurements from sensors that are in the mobile computing device 400 (e.g., GPS, accelerometer, microphone, ambient light sensor, etc.). The application data parameters 426 may include data from other applications at the mobile computing device 400 (e.g., a calendar application, a food-ordering application, an exercise-tracking application, a diet-tracking application, a social networking application, a browser application, etc.). The survey data parameters 430 may include user-specified responses to survey questions. In some implementations, the request 450 may include the data items 472. In such implementations, the request 450 can include an entire data item 472. Alternatively, the request 450 may include information that identifies the data item 472 (e.g., a data item identifier (ID)).

The mobile computing device 400 can generate the request 450 in response to receiving a user input. For example, the data item managing application may display a button 480. Upon detecting a user selection of the button 480, the mobile computing device 400 can generate the request 450. Alternatively or additionally, the mobile computing device 400 can generate the request 450 periodically (e.g., every 30 minutes). Alternatively or additionally, the mobile computing device 400 can generate the request 450 when the mobile computing device 400 launches the data item managing application.

The server 200 receives the request 450. The server 200 determines a display order for the data items 472 based on the contextual data 456 indicated in the request 450. Upon determining the display order, the server 200 indicates the display order to the mobile computing device 400. The server 200 may indicate the display order by sending an ordered list 470 of data items 472 to the mobile computing device 400. In some implementations, the ordered list 470 includes a score 474 for each data item 472. The server 200 generates the scores 474 for the data items 472 based on the contextual data 456. The scores 474 indicate a display order for the data items 472. For example, the mobile computing device 400 can utilize the scores 474 to re-arrange the display of the data items 472, so that data items 472 that have a higher score 474 are displayed towards the top of the list, and data items 472 that have a lower score 474 are displayed towards the bottom of the list. The scores 474 may include decimal numbers. Alternatively, the scores 474 may include integer numbers. The scores 474 may be referred to as ranks (e.g., if the scores 474 include integer numbers).

Referring to the data items 472, the data items 472 may include displayable information. Displayable information refers to information that can be displayed at the mobile computing device 400. The displayable information may include a text string, an image, a video, and/or a user-selectable link. If the data items 472 correspond with tasks, then the data items 472 may include a time duration that indicates the amount of time that it may take to complete the task. The data item 472 may also include a category that is associated with the data item 472.

Referring to the sensor devices 20, the neuro device 20-1 may refer to a device that can monitor and/or stimulate the electrical activity of a brain. For example, the neuro device 20-1 may include a brain imaging device (e.g., FNIRS (functional near-infrared spectroscopy), EEG (electroencephalogram), etc.), and/or a brain stimulation device (e.g., TDCS (transcranial direct current stimulation) device, etc.). The brain stimulation device may be referred to as a brain manipulation device. The neuro device 20-1 can determine a global oscillatory power of the brain. The global oscillatory power may be measured in Hertz (Hz). The global oscillatory power may indicate the type of rhythm that the brain is exhibiting. For example, the global oscillatory power may indicate whether the brain of a user is exhibiting a theta rhythm (e.g., 2-8 Hz), an alpha rhythm (e.g., 8-13 Hz), or a beta rhythm (e.g., 13-30 Hz). Alternatively or additionally, the neuro device 20-1 may specify the type of rhythm that the brain is exhibiting (e.g., theta rhythm, alpha rhythm, beta rhythm, etc.).

The heart rate monitor 20-2 can measure a heart rate of the user and transmit the measured heart rate to the mobile computing device 400. The blood glucose monitor 20-3 can measure a blood glucose level of the user and transmit the measured blood glucose level to the mobile computing device 400. The blood glucose monitor 20-3 may be subcutaneous (e.g., under the skin) or transcutaneous (e.g., over the skin). The insulin pump 20-4 can administer insulin to the user. The insulin pump 20-4 can measure the amount of insulin that is administered and transmit an indication of the amount to the mobile computing device 400. In some examples, the insulin pump 20-4 may administer glycogen and transmit an indication of the amount of glycogen that is administered to the mobile computing device 400.

The wearable computing device 20-5 may refer to a portable electronic device that can be worn by a user. The wearable computing device 20-5 may be worn around a wrist of the user. The wearable computing device 20-5 may include an activity monitor that can measure various activities that the user performs. For example, the activity monitor may measure a number of steps that the user walks, a number of floors that the user ascends, a number of hours that the user sleeps, a number of minutes that the user spends being active, a number of calories that the user burns, etc. The wearable computing device 20-5 can employ various sensors to measure the activities. For example, the wearable computing device 20-5 may utilize an accelerometer, a gyroscope, a compass, an ambient light sensor, an optical heartbeat sensor, an altimeter, etc.

In some implementations, a sensor device 20 may be associated with an electrical appliance such as an oven, a microwave, a refrigerator, etc. A sensor device 20 that is associated with an electrical appliance can send information to the mobile computing device 400 regarding a state of the electrical appliance. For example, a sensor device 20 that is associated with an oven can send an indication to the mobile computing device 400 that the oven temperature has reached a specific temperature. Sensor devices 20 that are associated with appliances may also receive instructions from the mobile computing device 400. For example, a sensor device 20 that is associated with the oven can receive an instruction to pre-heat the oven to a specified temperature.

In some implementations, a sensor device 20 may be associated with an automobile. A sensor device 20 that is associated with an automobile can send information to the mobile computing device 400 regarding a state of the automobile (e.g., tire pressure, gas level, location, etc.). Sensor devices 20 that are associated with an automobile may also receive instructions from the mobile computing device 400. For example, a sensor device 20 that is associated with an automobile can receive an instruction to cause the automobile to move from one position (e.g., inside a car garage) to another position (e.g., outside the car garage).

In some implementations, a sensor device 20 may be associated with a human operator that is different from the user of the mobile computing device 400. For example, the user of the mobile computing device 400 may be a healthcare provider (e.g., a nurse or a doctor), and the sensor device 20 may be attached to a patient of the healthcare provider. In some scenarios, the sensor device 20 may be attached to an infant, and the user of the mobile computing device 400 may be a parent of the infant. In some implementations, a sensor device 20 may be associated with an animal. For example, the sensor device 20 may be attached to a dog, and the user of the mobile computing device 400 may be a dog trainer.

The mobile computing device 400 may receive the sensor values 406 from the sensor devices 20 via short-range communications. For example, the mobile computing device 400 may receive the sensor values 406 from the sensor devices 20 via Bluetooth, Bluetooth Low Energy, Near Field Communications (NFC), Wireless Fidelity (Wi-Fi), etc. In some implementations, the mobile computing device 400 may transmit information to some of the sensor devices 20. For example, the mobile computing device 400 can instruct the neuro device 20-1 to stimulate electrical activity in the brain in a particular manner.

Figure 2A:
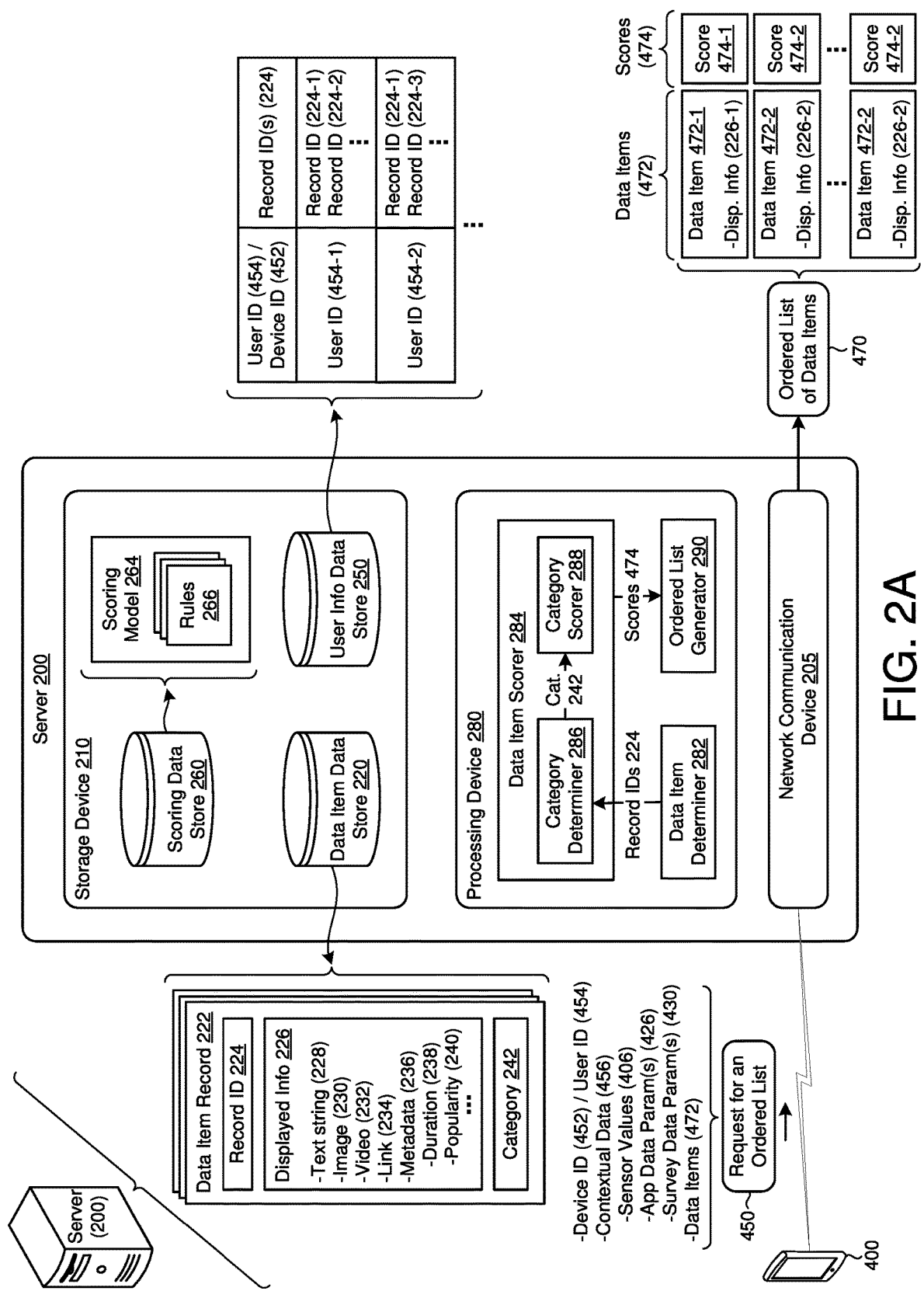
FIG. 2A is a block diagram of a server that determines a display order for the data items based on the contextual data.

FIG. 2A illustrates an example block diagram of the server 200. In general, the server 200 receives a request 450 to determine a display order for the data items 472. The display order refers to an order in which the data items 472 are displayed at the mobile computing device 400. The request 450 includes contextual data 456 that indicates a context of the mobile computing device 400. The server 200 utilizes the contextual data 456 to determine a display order for the data items 472. Upon determining the display order for the data items 472, the server 200 transmits an ordered list 470 that specifies the display order for the data items 472. The ordered list 470 may include the data items 472. The ordered list 470 can specify the display order of the data items 472 by including scores 474 for the data items 472. The mobile computing device 400 can utilize the scores 474 to re-arrange the display order of the data items 472, so that the data items 474 are displayed according to the display order determined by the server 200. For example, the mobile computing device 400 can display the data item 472 with the highest score 474 towards the top of the list, and the data item 472 with the lowest score 474 towards the bottom of the list.

The server 200 may include a network communication device 205, a storage device 210, and a processing device 280. The server 200 may be implemented by a cloud computing platform. The cloud computing platform may include a collection of remote computing services. The cloud computing platform may include computing resources (e.g., the processing device 280). The computing resources may include physical servers that have physical central processing units (pCPUs). The cloud computing resources may include storage resources (e.g., the storage device 210). The storage resources may include database servers that support NoSQL, MySQL, Oracle, SQL Server, or the like. The cloud computing platform may include networking resources (e.g., the network communication device 205). Example cloud computing platforms include Amazon Web Services®, Google Cloud Platform®, Microsoft AZURE™ and Alibaba Aliyun™.

The network communication device 205 communicates with a network (e.g., the network shown in FIG. 1). The network communication device 205 may include a communication interface that performs wired communication (e.g., via Ethernet, Universal Serial Bus (USB) or fiber-optic cables). The network communication device 205 may perform wireless communication (e.g., via Wi-Fi, Bluetooth, Bluetooth Low Energy (BLE), Near Field Communications (NFC), ZigBee, a cellular network, or satellites). The network communication device 205 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 210 stores data. The storage device 210 may include one or more computer readable storage mediums. For example, the storage device 210 may include solid state memory devices, hard disk memory devices, optical disk drives, read-only memory and/or nanotube-based storage devices. The storage device 210 may be connected to the processing device 280 via a bus and/or a network. Different storage mediums within the storage device 210 may be located at the same physical location (e.g., in the same data center, same rack, or same housing). Different storage mediums of the storage device 210 may be distributed (e.g., in different data centers, different racks, or different housings). The storage device 210 may store a data item data store 220, a user information data store 250, and a scoring data store 260.

The data item data store 220 stores information regarding the data items 472. The data item data store 220 may store data item records 222 that correspond with the data items 472. A data item record 222 may include a record ID 224. The record ID 224 may include a string that identifies the data item record 222. A data item record 222 may store displayable information 226. Displayable information 226 refers to information that can be displayed at the mobile computing device 400. The displayable information 226 may include a text string 228, an image 230, a video 232, and/or a user-selectable link 234. The link 234 may include a web uniform resource locator (URL). Alternatively or additionally, the link 234 may include a uniform resource identifier (URI) that identifies a particular native application that may be installed at the mobile computing device 400. The displayable information 226 may include metadata 236 such as a time duration 238 associated with the data item 472, a popularity 240 of the data item 472, etc. In some implementations, the data item records 222 may be referred to as task records (e.g., when the data items 472 correspond with tasks).

A data item record 222 may also store a category 242 of the corresponding data item 472. The category 242 may indicate a target level of cognition for effectively interacting with the data item 472. For example, if the data item 472 is a task, then the category 242 may indicate a level of cognition for effectively completing the task. Example categories 242 for the data items 472 include cognitively demanding, creative, mnemonic and rote. Data items 472 that are in the cognitively demanding category may involve a high degree of cognition. In other words, interacting with data items 472 that are in the cognitively demanding category may require the user of the mobile computing device 400 to acquire the information stored in the data item 472, and understand the information through thought, experience and the senses. Interacting with data items 472 in the creative category may require a certain amount of creativity. In other words, viewing or acting upon creative data items may involve imagination or original ideas. Interacting with data items 472 in the mnemonic category may involve remembering or memorizing information. Lastly, interacting with data items 472 in the rote category may involve repetition of habitual tasks. Other categories 242 are also contemplated.

The server 200 may utilize the categories 242 to determine a display order for the data items 472. For example, data items 472 in a particular category may be more relevant than data items 472 in other categories based on the contextual data 456. Accordingly, the server 200 can determine a display order in which the more relevant data items 472 are displayed towards the top of the list, and the less relevant data items 472 are displayed towards the bottom of the list. Specifically, the server 200 can assign a higher score 474 to data items 472 that are more relevant, and a lower score 474 to data items that are less relevant. As an example, the contextual data 456 may indicate that the user has exercised. In this example, the user may be more effective at performing tasks that are in the mnemonic category than tasks that are in the rote category. Accordingly, the server 200 can assign scores 474 in such a manner that data items 472 in the mnemonic category receive a higher score than data items 472 in the rote category. Similarly, if the contextual data 456 indicates that the user recently had a high dosage of a stimulant (e.g., caffeine), then the user may be more effective at performing cognitively demanding tasks than mnemonic tasks. In this example, the server 200 can assign scores 474 in such a manner that data items 472 in the cognitively demanding category receive a higher score than data items 472 in the mnemonic category.

The user information data store 250 stores user IDs 454 in association with record IDs 224 that identify specific data item records 222. In other words, the user information data store 250 can indicate the data item records 222 that a particular user ID 454 may be associated with. Additionally or alternatively, the user information data store 250 may store device IDs 452 and their associated record IDs 224. The user information data store 250 may include one or more look-up tables (LUTs), indices (e.g., inverted indices), or other data structure. For example, the user information data store 250 may include a look-up table that stores the user IDs 454 as keys, and the corresponding record IDs 224 as values.

The scoring data store 260 may store a scoring model 264 that can be used to determine the scores 474 for the data items 472. The scoring model 264 may utilize one or more rules 266 to determine category scores for the categories 242. Each rule 266 can specify a condition. The condition may specify a particular sensor value 406, a particular application data parameter 426, and/or a particular survey data parameter 430. If the condition specified by a rule 266 is satisfied (e.g., met), then the category scores for the categories 242 referenced by the rule 266 can be adjusted (e.g., increased or decreased). As an example, a particular rule 266 can increase the category score for the mnemonic category by one, and decrease the category score for the rote category by one, if the contextual data 456 indicates that the user exercised for 30 minutes. In this example, the contextual data 456 may indicate that the user exercised for 30 minutes, if the average sensor value 406 for heart rate was above 120 beats per minute during the last 30 minutes. See FIG. 2C for examples of the rules 266.

The scoring model 264 may include a machine-learned regression model. The scoring model 264 may be implemented as a set of supervised, semi-supervised, or unsupervised tasks. The scoring model 264 may utilize training data. The training data may include information that has been labeled by a human operator. The scoring model 264 may be implemented a set of gradient-boosted decision trees.

The processing device 280 may include a collection of one or more computing processors that execute computer readable instructions. The computing processors of the processing device 280 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 280 may execute computer-readable instructions that correspond with a data item determiner 282, a data item scorer 284, and an ordered list generator 290.

The data item determiner 282 receives the request 450, and determines the data items 472 associated with the request 450. In some implementations, the request 450 may include the data items 472. In such implementations, the data item determiner 282 may determine the data items 472 by retrieving the data items 472 from the request 450. In some implementations, the request 450 may include the record IDs 224. In such implementations, the data item determiner 282 may determine the data items 472 by retrieving the record IDs 224 from the request 450. In some implementations, the request 450 may include a device ID 452 and/or a user ID 454. In such implementations, the data item determiner 282 can query the user information data store 250 with the device ID 452 and/or the user ID 454 specified in the request 450. In response to such a query, the data item determiner 282 can receive the record IDs 224 that are associated with the device ID 452 and/or the user ID 454 specified in the request 450.

The data item scorer 284 determines scores 474 for the data items 472 that are associated with the request 450. The data item scorer 284 can utilize the scoring model 264 to determine the scores 474 for the data items 472. In some implementations, the data item scorer 284 may compute a feature vector for each data item 472. The feature vector may include one or more feature values. The feature values can be binary or decimal. Upon computing the feature vectors, the data item scorer 284 can input the feature vectors into the scoring model 264 to generate the scores 474 for the data items 472. The feature values in the feature vectors can include the sensor values 406, the application data parameters 426, and/or the survey data parameters 430. For example, the feature values may include a heart rate measurement, a blood glucose measurement, a global oscillatory power measurement, etc. The feature values may also include information from the data item records 222. For example, the feature values may include the duration 238, the popularity 240, a length of the text string 228, a size of the video 232, etc. A feature value may include the category 242 of the data item 472.

The data item scorer 284 may determine the scores 474 for the data items 472 based on a chronotype of the user of the mobile computing device 400. The chronotype of the user may refer to the behavioral manifestation of underlying circadian rhythms of myriad physical processes. The chronotype of the user may refer to the propensity for the user to perform a particular activity at a certain time during the day. For example, the chronotype of a user may indicate the propensity for sleeping late (e.g., after 2 am). The data item scorer 284 may determine the chronotype of the user and include the chronotype as a feature value in the feature vectors. The data item scorer 284 may determine the chronotype based on the contextual data 456. For example, the user may specify the chronotype as a survey data parameter 430. Advantageously, by utilizing the chronotype to generate the scores 474, the data item scorer 284 can optimize the sequence of the data items 472 for the user. In other words, the data item scorer 284 allows the user to interact with a particular data item 472 when the user has the highest propensity for interacting with that particular data item 472.

In some implementations, the score 474 for a data item 472 may be the score for a category 242 of the data item 472. In other words, the data item scorer 284 may determine the score 474 for a data item 472 by determining a category 242 of the data item 472, and determining a score for the category 242. The data item scorer 284 may include a category determiner 286, and a category scorer 288. The category determiner 286 determines the category 242 of the data item 472, and the category scorer 288 determines a score for the category 242.

The category determiner 286 determines the categories 242 of the data items 472 that are associated with the request 450. In some implementations, the category determiner 286 can determine the categories 242 by retrieving the categories 242 from the data item data store 220. For example, the category determiner 286 can query the data item data store 220 with the record IDs 224 identified by the data item determiner 282. In response to such a query, the category determiner 286 can receive the categories 242 of the data items 472 associated with the request 450. In some implementations, the data item data store 220 may not include the category 242 for a data item 472. For example, the user of the mobile computing device 400 may have generated a data item 472 that does not have a corresponding data item record 222 in the data item data store 220. In such implementations, the category determiner 286 may utilize a text categorizer to determine a category of the data item 472. For example, the category determiner 286 can retrieve a text string from the data item 472, provide the text string to the text categorizer as an input, and receive the category of the data item 472 as an output.

The text categorizer may utilize techniques associated with supervised data classification, unsupervised data classification, and/or semi-supervised data classification to classify a data item 472 into a category 242. For example, the text categorizer may include a Bayes classifier (e.g., a naive Bayes classifier), a set-based classifier (e.g., a rough set-based classifier, or a soft set-based classifier), etc. The text categorizer can also utilize techniques associated with the k-nearest neighbors algorithm, the expectation-maximization algorithm, or variants thereof.

The category scorer 288 scores the categories 242 that are associated with the request 450. The category scorer 288 can retrieve the scoring model 264 from the scoring data store 260, and utilize the scoring model 264 to generate the category scores. Utilizing the scoring model 264 may include utilizing the rules 266. Specifically, the category scorer 288 can identify the rules 266 that are satisfied based on the contextual data 456 specified in the request 450. For each rule 266 that is satisfied, the category scorer 288 can adjust the category scores in a manner specified by the rule 266. See FIG. 2C for a set of example rules 466, and their effect on example category scores.

The data item scorer 284 can determine the scores 474 for the data items 472 based on the category scores determined by the category scorer 288. In some implementations, the data item scorer 284 can set the score 474 for a data item 472 to be equal to the category score for the category 242 of the data item 472. Upon determining the scores 474 for the data items 472, the server 200 can generate the ordered list 470 of the data items 472.

The ordered list generator 290 generates the ordered list 470 of the data items 472, and transmits the ordered list 470 to the mobile computing device 400 via the network communication device 205. The ordered list 470 may include the data items 472, and the score 474 for each data item 472. The ordered list generator 290 can generate the ordered list 470 by instantiating a data container, and writing the data items 472 and their scores 474 to the data container. The data container may be a JSON object, an XML file, etc. If the request 450 includes information that identified the data items 472, then the ordered list generator 290 can include the same information along with respective scores 474 for the data items 472. For example, if the request 450 included data item IDs that identified the data items 472, then the ordered list 470 can include the same data item IDs and respective scores 474 for the data item IDs. If the request 450 does not include information regarding the data items 472, then the ordered list generator 290 can include information regarding the data items 472 in the ordered list 470. For example, the ordered list generator 290 can receive the record IDs 224 from the data item determiner 282. For each record ID 224 that the data item determiner 282 identifies, the ordered list generator 290 can retrieve the displayable information 226 from the data item data store 220, and include the displayable information 226 in the ordered list 470.

The scores 474 for the data items 472 can indicate a display order for the data items 472. For example, data items 472 with higher scores 474 rank higher in the display order, while data items 472 with lower scores 474 rank lower in the display order. As described herein, in some implementations, the scores 474 for the data items 472 may be the same as the category scores for the categories 242 of the data items 472. In such implementations, data items 472 that belong to the same category 242 may have the same score 474. The ordered list generator 290 can determine a suborder for data items 472 in the same category 242 based on the contextual data 456 and/or the displayable information 226. For example, the ordered list generator 290 may sort data items 472 that have the same scores 474 based on the time duration 238, the popularity 240, and/or a size (e.g., length of the text string 228) of the data items 472.

In some examples, one of the application data parameters 426 may include a start time of the next calendar event scheduled in a calendar application that is installed on the mobile computing device 400. In such examples, the ordered list generator 290 can calculate a time difference between a current time and the start time of the next calendar event. The time difference may be referred to as the available time. The ordered list generator 290 can order data items 472 that have the same scores 474 based on a comparison of their time durations 238 and the available time. Specifically, the ordered list generator 290 can order the data items 472 such that data items 472 that have a time duration 238 that is less than the available time are ranked higher than data items 472 with a time duration 238 that is greater than the available time. Advantageously, tasks that a user of the mobile computing device 400 can complete in the available time are ranked higher than tasks that the user may not be able to complete in the available time.

FIG. 2B is an example block diagram of the rules 266 that the server 200 may utilize to determine category scores 244 for the categories 242 of the data items 472. A rule 266 can specify one or more conditions that reference one or more sensor values 406, one or more application data parameters 426, and/or one or more survey data parameter 430. In addition to specifying conditions, a rule 266 can also specify the effect that the condition(s) can have on one or more category scores 244 for one or more categories 242. In other words, if the conditions (e.g., all the conditions) specified by a rule 266 are satisfied, then the server 200 can adjust the category scores 244 that are affected by the rule 266 in the manner prescribed by the rule 266.

FIG. 2C illustrates example rules 266-1 . . . 266-10 and their effect on example category scores 244-1 . . . 244-4. In the example of FIG. 2C, the category scores 244-1, 244-2, 244-3 and 244-4 are for the cognitively demanding category, creative category, mnemonic category, and rote category, respectively. The first three rules 266-1, 266-2, and 266-3 include conditions that specify specific values for global oscillatory power. Global oscillatory power refers to a measure of electrical activity in the brain. Global oscillatory power may be measured by the neuro device 20-1 shown in FIG. 1. Referring to the first rule 266-1, if the request 450 indicates that the global oscillatory power is between 2-8 Hz, then the server 200 can increase the first category score 244-1 and the third category score 244-1 by one. Referring to the second rule 266-2, if the request 450 indicates that the global oscillatory power is between 8-13 Hz, then the server 200 can decrease the first category score 244-1 and the third category score 244-3 by one, and increase the second category score 244-2 by one. Referring to the third rule 266-3, if the request 450 indicates that the global oscillatory power is between 13-30 Hz, then the server 200 can increase the first category score 244-1 and the fourth category score 244-4 by one, and decrease the second category score 244-2 by one.

In some implementations, the conditions specified by the first three rules 266-1, 266-2, and 266-3 may include type of rhythms. The request 450 may indicate a type of rhythm that the brain of the user is currently exhibiting. In the example of FIG. 2C, the server 200 can utilize the first three rules 266-1 . . . 266-3, if the request 450 indicates the type of rhythm. For example, if the request 450 indicates a theta rhythm, then the server 200 adjusts the category scores 244-1 . . . 244-4 in accordance with the first rule 266-1. The first rule 266-1 boosts the category scores 244-1, 244-3 for the cognitively demanding category and the mnemonic category, respectively, because the user may be more effective at completing tasks in these categories when the user's brain exhibits a theta rhythm. If the request 450 indicates an alpha rhythm, then the server 200 can adjust the category scores 244-1 . . . 244-4 according to the second rule 266-1.

The second rule 266-2 decreases the category scores 244-1, 244-3 for the cognitively demanding category and the mnemonic category, respectively, because the user may be less effective at completing tasks in these categories when the user's brain exhibits an alpha rhythm. Similarly, if the request 450 indicates a beta rhythm, then the server 200 can adjust the category scores 244-1 . . . 244-4 in accordance with the third rule 266-3. The third rule 266-3 boosts the category scores 244-1, 244-4 for the cognitively demanding category and the rote category, respectively, because the user may be more effective at completing tasks in these categories when the user's brain exhibits a beta rhythm.

Referring to the fourth rule 266-4, if the server 400 determines that the user of the mobile computing device 400 has exercised for 30 minutes, then the server 400 can increase the third category score 244-3 by one, and decrease the fourth category score 244-4 by one. The server 400 may determine that the user of the mobile computing device 400 has exercised for 30 minutes, if the request 450 indicates that the average heart rate was greater than 120 beats per minute for the last 30 minutes. The heart rate may have been measured by the heart rate monitor 20-2, and/or the wearable computing device 20-5 shown in FIG. 1. The fourth rule 266-4 boosts the category score 244-3 for the mnemonic category because the user may be more effective at completing tasks in this category after exercising.

In the example of FIG. 2C, the fifth rule 266-5 to the eight rule 266-8 include conditions that reference a local time at the mobile computing device 400, and the age of the user of the mobile computing device 400. The request 450 may include the age of the user as a survey data parameter 430. The request 450 may include the local time at the mobile computing device 400 as a sensor value 406. Alternatively, the request 450 may include a time zone of the mobile computing device 400, and the server 200 may determine the local time at the mobile computing device 400 by retrieving the current time in the specified time zone from an internet time server.

Referring to the fifth rule 266-5, if the server 200 determines that the local time at the mobile computing device 400 is between 5 am and 11 am, and the age of the user is greater than 40, then the server 200 can increase the first category score 244-1 and the third category score 244-3 by one, and decrease the fourth category score 244-4. Users that are older than 40 may be more effective at performing cognitively demanding tasks and mnemonic tasks in the morning. Hence, increasing the category scores 244 for the cognitively demanding category 242 and the mnemonic category 242 causes tasks in these categories to be ranked higher in the display order.

Referring to the sixth rule 266-6, if the server 200 determines that the local time at the mobile computing device 400 is between 7 pm-11 pm, and the age of the user is greater than 40, then the server 200 can increase the second category score 244-2 and the fourth category score 244-4 by one, and decrease the first category score 244-1 by one. Users that are older than 40 may be more effective at performing creative tasks and rote tasks in the evening, and less effective at performing cognitively demanding tasks in the evening. Hence, decreasing the category score 244 for the cognitively demanding category 242 causes tasks in the cognitively demanding category to be ranked lower in the display order.

Referring to the seventh rule 266-7, if the server 200 determines that the local time at the mobile computing device 400 is between 5 am and 11 am, and the age of the user is less than 40, then the server 200 can increase the second category score 244-2, and decrease the first category score 244-1 and the third category score 244-3. Users that are younger than 40 may be less effective at performing cognitively demanding tasks and mnemonic tasks in the morning. Hence, decreasing the category scores 244 for the cognitively demanding category 242 and the mnemonic category 242 causes tasks in these categories to be ranked lower in the display order.

Referring to the eighth rule 266-8, if the server 200 determines that the local time at the mobile computing device 400 is between 11 pm and 3 am, and the age of the user is less than 40, then the server 200 can increase the first category score 244-1 and the third category score 244-3. Users that are younger than 40 may be more effective at performing cognitively demanding tasks and mnemonic tasks late at night. Hence, increasing the first category score 244-1 for the cognitively demanding category 242, and the third category score 244-3 for the mnemonic category 242 causes tasks in these categories to be ranked higher in the display order.

In the example of FIG. 2C, the ninth rule 266-9 and the tenth rule 266-10 include conditions that reference an application data parameter 426. The request 450 may specify the start time of the next calendar event stored in a calendar application that is installed at the mobile computing device 400. The server 200 can compute an available time by calculating a difference between a current time and the start time of the next calendar event. If the available time is less than a threshold amount of time (e.g., 10 minutes), then the ninth rule 266-9 is triggered. When the ninth rule 226-9 is triggered, the server 200 decreases the first category score 244-1 and the second category score 244-2, and increases the fourth category score 244-4. Advantageously, when the available time is limited, then the time-intensive cognitively demanding tasks and creative tasks are ranked lower in the display order, whereas quick rote tasks are ranked higher. If the available time is greater than the threshold amount of time, then the tenth rule 266-10 is triggered. When the tenth rule 226-10 is triggered, the server 200 can increase the first category score 244-1, the second category score 244-2, and the third category score 244-3. Advantageously, when the available time is plentiful, then the time-intensive cognitively demanding, creative and mnemonic tasks can be ranked higher.

Figure 3A:
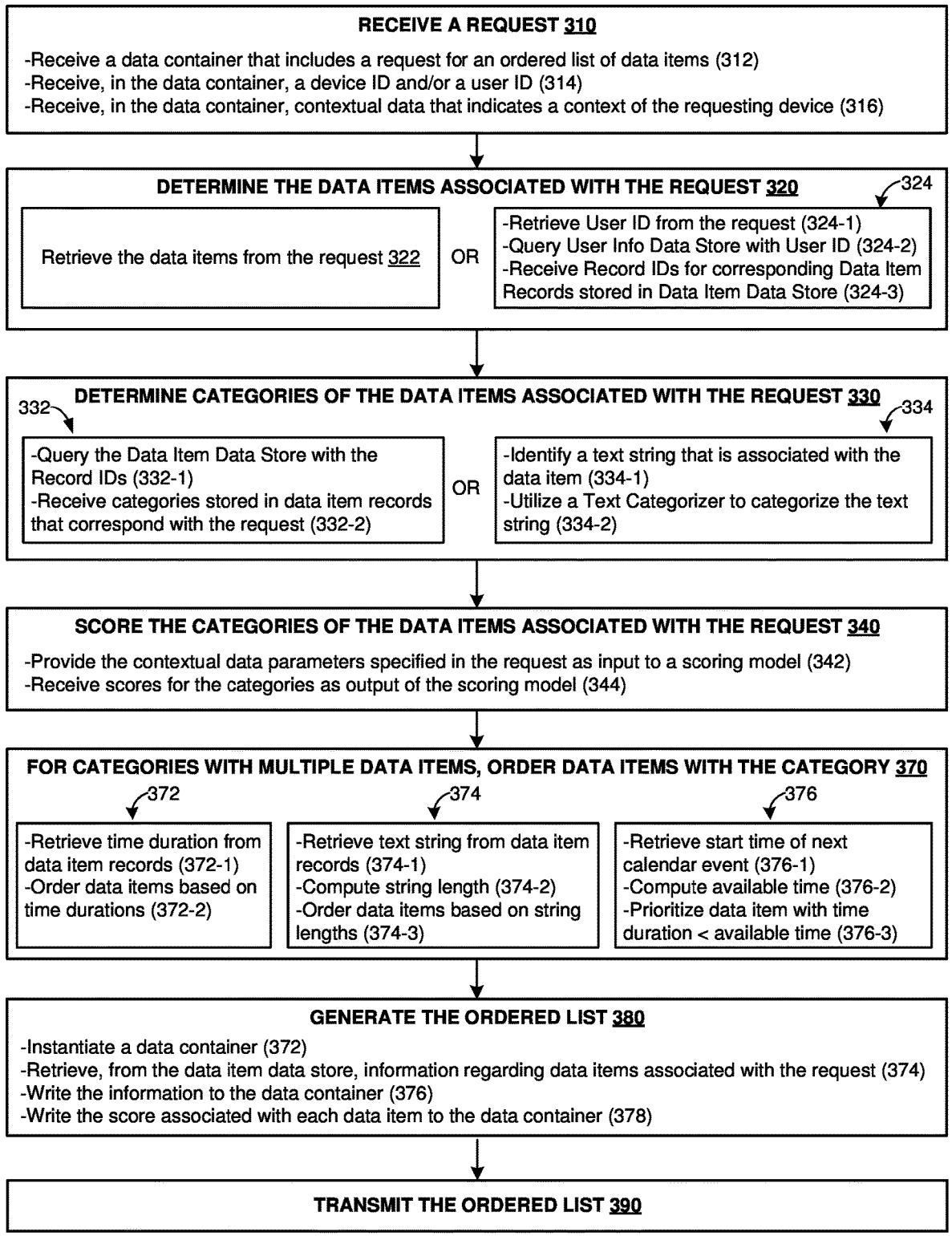
FIG. 3A is a block diagram of an example method that the server can execute to determine the display order for the data items.

FIG. 3A illustrates an example method 300 for determining a display order for data items. The method 300 may be executed by a server (e.g., the server 200 shown in FIG. 2A). The method 300 may be implemented as a set of computer-readable instructions that are executed by a processing device (e.g., the processing device 280 shown in FIG. 2A). Generally, the server receives a request to determine a display order for a set of data items (at 310). The server determines the data items that are associated with the request (at 320). The server determines scores for the data items. The server may determine the scores for a data item by determining the category of the data item (at 330), and scoring the category of the data item (at 340). The server generates an ordered list that specifies the display order for the data items (at 370). The ordered list includes the scores for the data items, and the scores indicate the display order of the data items. The server transmits the ordered list at 390.

Referring to 310, the server receives a request to determine a display order for a set of data items. Receiving the request may include receiving a data container that includes information regarding the request (at 312). The data container may include a JavaScript Object Notation (JSON) object, an Extensible Markup Language (XML) file, etc.

Receiving the request may include receiving a device ID and/or a user ID (at 314). The device ID may include a string that identifies a mobile computing device that generated the request (e.g., an IP address, a MAC address, a SIM number, an IMEI, etc.). The user ID 454 may include a string that identifies a user of the mobile computing device 400 (e.g., a username, an email address, etc.).

Receiving the request may include receiving contextual data (at 316). The contextual data may indicate a context of the mobile computing device. The contextual data may include sensor values, application data parameters, and/or survey data parameters. The sensor values may have been recorded by sensor devices (e.g., the sensor devices 20 shown in FIG. 1). The application data parameters may include data from various applications at the mobile computing device (e.g., a calendar application, a food-ordering application, an exercise-tracking application, etc.). The survey data parameters may include user-specified responses to survey questions. In some implementations, the request may include the data items. In such implementations, the request can include an entire data item. Alternatively, the request may include information that identifies the data item (e.g., a data item ID).

At 320, the server determines the data items that are associated with the request. In some implementations, the request may include the data items. In such implementations, the server can determine the data items by retrieving the data items from the request (at 322). In some implementations, the request may specify the user ID and/or the device ID. In such implementations, the server can determine the data items that are associated with the request based on the user ID and/or the device ID specified in the request (at 324).

Referring to 324, the server can retrieve the user ID and/or the device ID from the request (at 324-1). The server may store a data item data store (e.g., the data item data store 220 shown in FIG. 2A) that stores data item records (e.g., the data item records 222 shown in FIG. 2A). Each data item record may correspond with a data item. Each data item record may include a record ID (e.g., record ID 224 shown in FIG. 2A) that identifies the data item record. The server may also store a user information data store (e.g., the user information data store 250 shown in FIG. 2A) that stores user IDs and/or device IDs, and their corresponding record IDs. In other words, the user information data store can identify the data items that may be associated with a user ID and/or a device ID.

At 324-2, the server can query the user information data store with the user ID and/or the device ID specified in the request. Querying the user information data store may include utilizing a look-up table that stores the user IDs and/or the device IDs, and their corresponding record IDs. In response to such a query, the server can receive the record IDs for the data item records that are associated with the user ID and/or the device ID (at 324-3).

At 330, the server determines the categories of the data items that are associated with the request. In some implementations, the server can determine the category of a data item by retrieving the category from the data item data store (at 332). In some implementations, the server can determine the category of a data item by utilizing a text categorizer (at 334). Referring to 332, the server can query the data item data store with the record IDs of the data item records that are associated with the request (at 332-1). Querying the data item data store may include querying an inverted index that maps the record IDs to the categories that are stored in the corresponding data item records. In response to querying the data item data store with the record IDs, the server can receive the categories that are associated with the data item records that correspond with the record IDs (at 332-2).

Referring to 334, the server can identify a text string that is associated with the data item (334-1). For example, the request may include a data item that a user of a mobile computing devise may have generated at the mobile computing device. In this example, the request may include a text string, an image, a video, and/or a link that is associated with the data item. In this example, the server can retrieve the text string from the request. At 334-2, the server can utilize a text categorizer to categorize the text string. In other words, the server can utilize the text categorizer to determine the categories of the data items that are associated with the request. The text categorizer can categorize the text string by utilizing techniques that are associated with supervised data classification, unsupervised data classification, and/or semi-supervised data classification. For example, the text categorizer may include a Bayes classifier (e.g., a naive Bayes classifier), a set-based classifier (e.g., a rough set-based classifier, or a soft set-based classifier), etc. The text categorizer can also utilize techniques associated with the k-nearest neighbors algorithm, the expectation-maximization algorithm, or variants thereof. Advantageously, the server can determine a category for a data item even if a data item record does not exist for the data item. In other words, the server may determine a category for a data item that is generated by a user of the mobile computing device.

At 340, the server scores the categories of the data items. The scores for the categories may be referred to as category scores. In general, the server may utilize a scoring model to determine the category scores. The server can provide the contextual data parameters that are specified in the request as input to the scoring model (at 342). Upon providing the contextual data parameters to the scoring model, the server may receive the category scores as output from the scoring model (at 344). In some implementations, the scoring model may determine category scores for the cognitively demanding category, the creative category, the mnemonic category, and the rote category. The scoring model may utilize various rules to determine the category scores. Each rule may include one or more conditions that reference one or more sensor values, one or more application data parameters, and/or one or more survey data parameters. See FIG. 3B for an example method that the server may execute to determine the category scores.

As described herein, in some implementations, the server may equate the score for a data item to the category score for the category of the data item. In such implementations, there may be scenarios in which multiple data items may have the same score because the data items belong to the same category. In such scenarios, the server can order the data items within the category. The server can order than data items based on a property of the data items, and/or based on the contextual data. For example, the server can order the data items based on a time duration associated with the data items (at 372). Alternatively or additionally, the server can order the data items based on a size of the data items (e.g., a length of a text string in the data items) (at 374). Alternatively or additionally, the server can order the data items based on a start time of the next calendar event stored in a calendar application that is installed on the mobile computing device (at 376).

Referring to 372, the server can order data items within a category based on the time duration associated with the data items. The server can retrieve the time durations associated with the data items from their corresponding data item records (at 372-1). The server can order the data items based on the time durations (at 372-2). For example, the server can order the data items such the data items with a relatively shorter time duration rank higher in the display order than data items with a relatively longer time duration.

Referring to 374, the server can order data items within a category based on a size of the data items. Specifically, the server can order data items with a category based on the length of a text string in the data item. At 374-1, the server can retrieve the text strings from the data item records that correspond with the data items. At 374-2, the server can compute the length of each string. At 374-3, the server can order the data items based on the length of their text strings. For example, the server can order the data items such that data items with relatively short text strings rank higher in the display order than data items with relatively long text strings.

Referring to 376, the server can order data items within a category based on the start time of the next calendar event stored in a calendar application that is installed at the mobile computing device. The server may receive the start time of the next calendar event as an application data parameter in the request (at 376-1). At 376-2, the server can compute a time difference between a current time and the start time of the next calendar event. This time difference may be referred to as the available time. At 376-3, the server can prioritize data items that have a time duration that is less than the available time. In other words, the server can order the data items such that the data items with a time duration shorter than the available time are ranked higher in the display order, and the data items with a time duration longer than the available time are ranked lower in the display order. Advantageously, tasks that can be completed during the available time can appear towards the top of the list, whereas tasks that the user may not be able to complete within the available time can appear towards the bottom of the list.

At 380, the server generates an ordered list of data items. The ordered list can specify the display order of the data items. The server can instantiate a data container (at 372). The data container may be a JSON object, an XML file, etc. At 374, the server can retrieve information regarding the data items from the data item data store. For example, the server can retrieve the text strings, the images, the videos, and/or the links from the data item records that correspond with the data items. At 376, the server writes the information regarding the data items to the data container. At 378, the server writes the score for each data item to the data container. Writing the score for a data item may refer to writing the category score for the category of the data item. In some implementations, the ordered list may include the data item IDs instead of the entire data items.

At 390, the server transmits the ordered list. The server can transmit the ordered list directly to the mobile computing device that generated the request. Alternatively, the server can transmit the ordered list to an intermediary device (e.g., a proxy server), and the intermediary device can forward the ordered list to the mobile computing device that generated the request.

In some implementations, the server can score the data items without categorizing the data items. For example, instead of categorizing the data items at 330 and scoring the categories at 340, the server can directly score the data items. The server may utilize a machine-learned scoring model to score the data items. In such implementations, the server may compute a feature vector for each data item. Upon computing the feature vectors, the server can feed the feature vectors to the scoring model as input, and the scoring model can generate the scores based on the feature vectors.

Figure 3B:
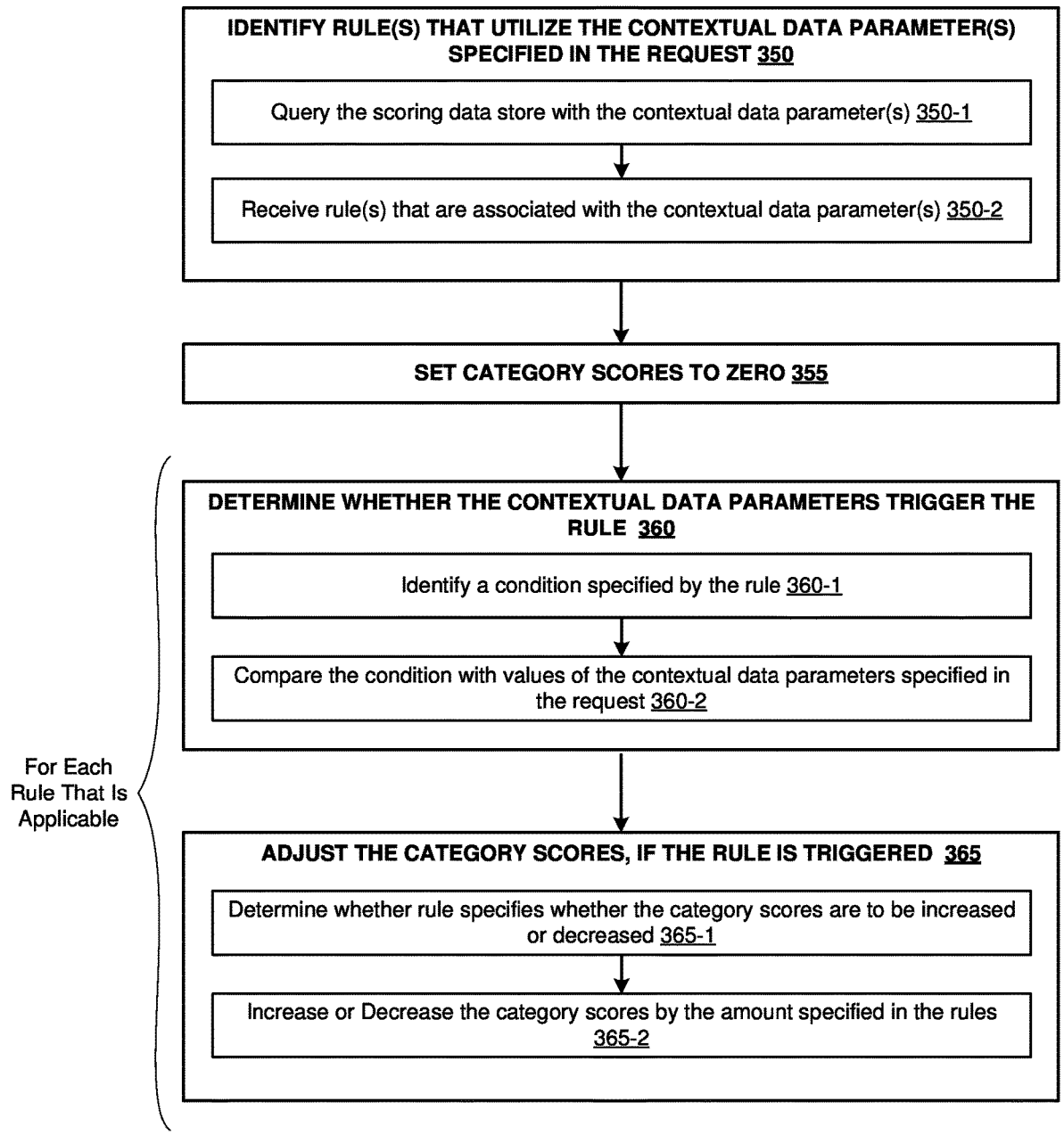
FIG. 3B is a block diagram of another example method that the server can execute to determine the display order for the data items.

FIG. 3B illustrates example operations 340 that the server can execute to determine the category scores for categories of data items that are associated with the request. As described herein, the server may store various rules that the server can utilize to determine the category scores. In general, the server can identify the rules that are applicable based on the contextual data parameters specified in the request (at 350). Upon identifying the applicable rules, the server can apply the rules to generate the category scores (at 360, 365).

Referring to 350, the server can identify rules that utilize the contextual data parameters specified in the request. As described herein, the server may store a scoring data store that stores the rules. Each rule may specify one or more conditions that reference one or more contextual data parameters. The scoring data store may include an inverted index that maps the contextual data parameters to the rules that depend on the contextual data parameters. The server can query the scoring data store with the contextual data parameters specified in the request (at 350-1). Querying the scoring data store may include querying the inverted index that maps the contextual data parameters to rules that utilize the contextual data parameters. In response to querying the scoring data store, the server can receive an indication of the rules that are associated with the contextual data parameters specified in the request (at 350-2). For example, the server may receive rule IDs that identify the rules that utilize the contextual data parameters that are specified in the request.

At 355, the server can set the category scores to zero. Setting the category scores to zero may include declaring (e.g., instantiating) variables for the category scores, and assigning the variables a value of zero. For each rule that may be affected by the contextual data parameters, the server can determine whether the contextual data parameters satisfy the rule (at 360). If the contextual data parameters satisfy the rule, then the server can adjust the category scores in accordance with the rule (at 365).

Referring to 360, the server can identify a condition (e.g., all the conditions) that the rule specifies (at 360-1). The server can compare the condition(s) with the values of the contextual data parameters specified in the request to determine whether the condition(s) is (are) satisfied (at 360-2). For example, if the condition specifies that the heart rate be greater than 120 beats per minute, then the server can determine whether the heart rate specified in the contextual data is greater than 120 beats per minute. If all the conditions specified by the rule are satisfied, then the rule is triggered, and the server can adjust the category scores in accordance with the rule (at 365).

Referring to 365, the server can adjust the category scores in accordance with a rule, if the conditions specified by the rule are satisfied. At 365-1, the server can identify the category scores affected by the rule. The server can also determine the manner in which the rule affects the category scores. For example, the server can determine whether the rule specifies an amount by which the category scores are to be increased or decreased. At 365-2, the server increases or decreases the category scores by the amount specified in the rules. The server can execute the operations indicated by 360 and 365 for each rule that utilizes the contextual data parameters specified in the request.

Figure 4:
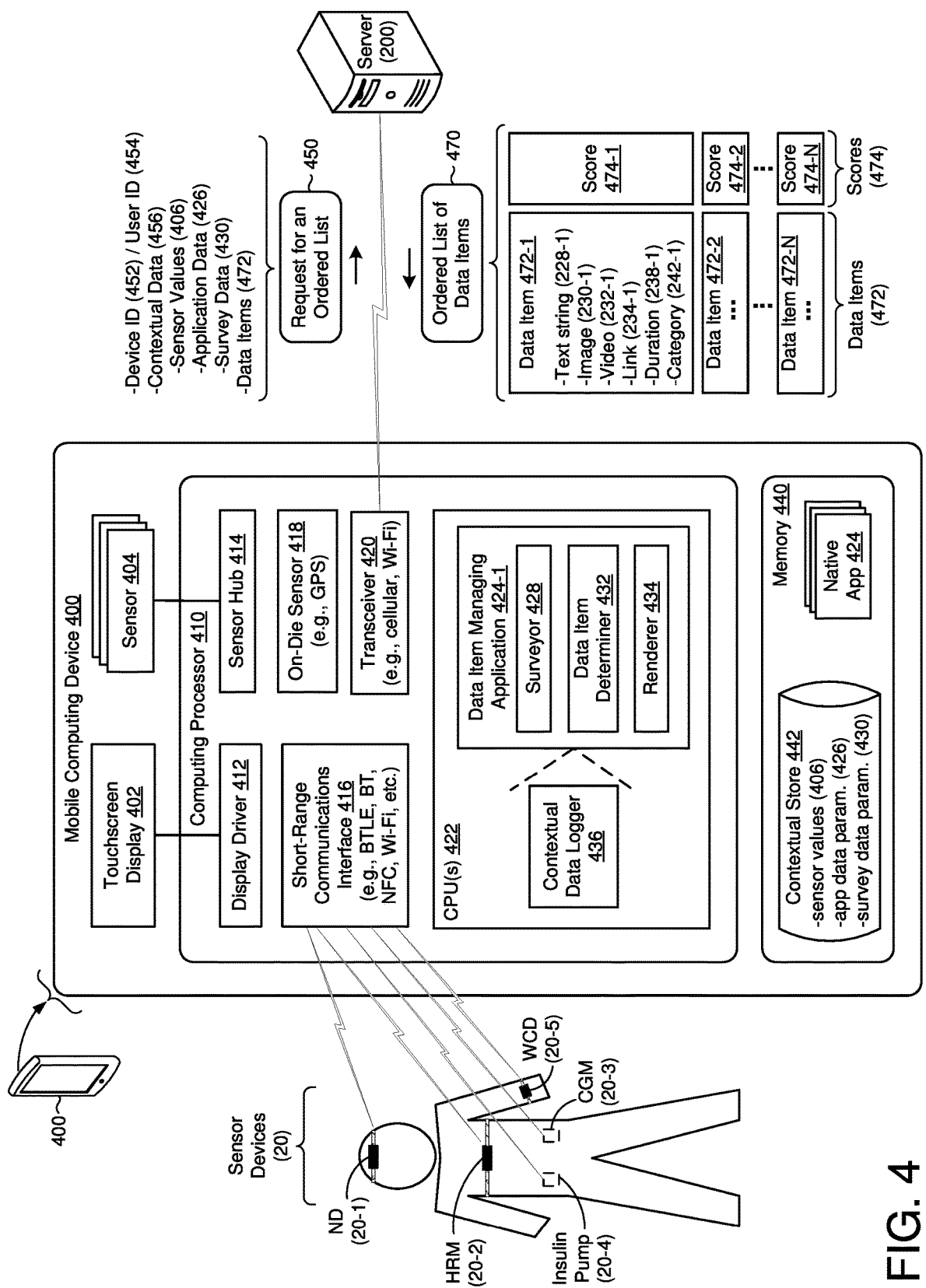
FIG. 4 is a block diagram of a mobile computing device that adjusts the display order of data items based on contextual data.

FIG. 4 is an example block diagram of the mobile computing device 400. The mobile computing device 400 may include a touchscreen display 402, one or more sensors 404, a computing processor 410, and a memory 440. The touchscreen display 402 may include a capacitive touchscreen, a resistive touchscreen, or the like. The one or more sensors 404 may include an accelerometer, a gyroscope, a magnetometer, a proximity sensor, a light sensor, a barometer, a thermometer, an air humidity sensor, a pedometer, a heart rate monitor, a fingerprint sensor, a microphone, and/or a camera.

The memory 440 may include one or more computer readable storage mediums. For example, the memory 440 may include solid state memory devices, hard disk memory devices, optical disk drives, read-only memory and/or nanotube-based storage devices. The memory 440 may be connected to the computing processor 410 via a bus (e.g., a data bus, an address bus, etc.) or one or more control lines. The memory 440 can store one or more native applications 424. A native application 424 may refer to a software program product that can be downloaded, installed, and executed by the computing processor 410. Examples of native applications 424 may include a data item managing application 424-1, a browser application, a social networking application, a food-ordering application, a sleep-tracking application, an exercise-tracking application, etc. The memory 440 may store a contextual data store 442 that can store the contextual data 456.

The computing processor 410 may include a display driver 412, a sensor hub 414, a short-range communications interface 416, one or more on-die sensors 418, a transceiver 420, and one or more central processing units (CPUs) 422. Referring to the one or more on-die sensors 418, the one or more on-die sensors 418 may include a location sensor that determines a location of the mobile computing device 400. The location sensor may use Global Positioning System (GPS) and/or Global Navigation Satellite System (GLONASS). In some implementations, the one or more sensors 404 may be integrated into the one or more on-die sensors 418. Hence, the one or more on-die sensors 418 may include an accelerometer, a magnetometer, a gyroscope, a thermometer, a fingerprint reader, etc.

The sensor hub 414 manages the sensor(s) 404, and the on-die sensor(s) 418. The sensor hub 414 receives sensor values 406 from the sensor(s) 404, and the on-die sensor(s) 418. The sensor values 406 refers to sensor measurements recorded by the sensor(s) 404, and the on-die sensor(s) 418. The sensor hub 414 can receive the sensor values 406 periodically, and/or in response to a request. The sensor hub 414 may store the sensor values 406 in the contextual data store 442. The computing processor 410 may retrieve the stored sensor values 406 from the contextual data store 442, and utilize the retrieved sensor values 406 at a later time. For example, the computing processor 410 may include the sensor values 406 in the request 450. The sensor hub 414 can also receive, via the short-range communications interface 416, sensor values 406 that are recorded by the sensor devices 20.

The display driver 412 drives the touchscreen display 402. In other words, the display driver 412 causes the touchscreen display 402 to display information. The display driver 412 may receive user input (e.g., user selections) from the touchscreen display 402. The display driver 412 may be referred to as display circuitry. The display driver 412 may include a Light Emitting Diode (LED) driver that can drive a LED display. The display driver 412 may drive a stereoscopic display (e.g., an autostereoscopic 3D display).

The short-range communications interface 416 enables the mobile computing device 400 to receive and/or transmit information via short-range communications. Short-range communications refers to wireless communication between electronic devices that are a relatively short distance apart (e.g., from several inches to tens of feet). The short-range communications interface 416 may include a transceiver that supports Bluetooth, Bluetooth Low Energy, Wireless Fidelity (Wi-Fi), Near Field Communications (NFC), and/or ZigBee. The short-range communications interface 416 allows the mobile computing device 400 to receive sensor values 406 from the sensor devices 20.

The transceiver 420 enables electronic communication with other devices and network entities (e.g., the server 200). The transceiver 420 may include a cellular transceiver, for example, a Long Term Evolution (LTE) transceiver, a LTE-Advanced transceiver, or a 5G ($5^{th}$ generation mobile network) transceiver. The transceiver 420 may include a Wi-Fi transceiver. In some implementations, the short-range communications interface 416 may be integrated into the transceiver 420. Hence, the transceiver 420 may include a ZigBee transceiver, a Bluetooth transceiver (e.g., Bluetooth Low Energy transceiver), a Near Field Communications (NFC) transceiver, etc. In some implementations, the transceiver 420 may include a wired transceiver that communicates via a wired interface (e.g., an Ethernet cable, a USB cable, or the like).

The CPU(s) 422 are capable of executing computer-readable instructions. For example, the CPU(s) can execute computer-readable instructions that correspond with the native applications 424. The CPU(s) 422 may be based on the reduced instruction set computing (RISC) architecture (e.g., an ARM processor). Alternatively, the CPU(s) 422 may be based on the complex instruction set computing (CISC) architecture (e.g., an x86 processor). The CPU(s) 422 can be based on other architectural models (e.g., quantum computing). The CPU(s) 422 may include a single CPU or multiple CPUs (e.g., dual-core, quad-core or octa-core). The CPU(s) 422 may include general-purpose CPU(s) or special-purpose CPU(s), for example, Application Specific Integrated Circuit(s) (ASIC(s)), vector processors, etc. In the example of FIG. 4, the CPU(s) 422 is (are) executing computer-readable instructions that correspond with a data item managing application 424-1, and a contextual data logger 436.

The contextual data logger 436 logs (e.g., captures) the contextual data 456. The contextual data logger 436 can store the contextual data 456 in the contextual data store 442. Logging the contextual data 456 may include receiving the sensor values 406 from the sensor devices 20, the one or more sensors 404, and/or the one or more on-die sensors 418. The contextual data logger 436 can receive the sensor values 406 recorded by the sensor(s) 404, and the on-die sensor(s) 418 from the sensor hub 414. The contextual data logger 436 may receive the sensor values 406 recorded by the sensor devices 20 from the sensor hub 414, or from the short-range communications interface 416.

The contextual data logger 436 can log (e.g., capture) the application data parameters 426. The application data parameters 426 may refer to information that is stored and/or displayed by the native applications 424. For example, the application data parameters 426 may include the start time and the end time of calendar events that are stored in a calendar application. The application data parameters 426 may include information regarding physical activity that is monitored and/or logged by a fitness-tracking application. The application data parameters 426 may include information regarding meals that user may have had. Information regarding the meals may be from a food-ordering application and/or a diet-tracking application. The application data parameters 426 may include information regarding when the user of the mobile computing device 400 uses a social networking application, or a browser application. The contextual data logger 436 may receive (e.g., periodically receive) the application data parameters 426 as a push message. Alternatively or additionally, the contextual data logger 436 can utilize one or more application programming interfaces (APIs) to retrieve the application data parameter(s) 426.

The contextual data logger 436 can log (e.g., capture) survey data parameters 430. The mobile computing device 400 can display one or more surveys for the user of the mobile computing device 400 to complete. Each survey may include one or more questions (See FIG. 5 for example surveys). The survey data parameters 430 may refer to user-specified responses to the questions in the surveys. The survey data parameters 430 may include subjective information from a user that the sensor values 406 and the application data parameters 426 may not include. For example, a survey question can prompt the user to specify the user's ability to focus on a scale from 1 to 5. In this example, the user's ability to focus may not be easily measurable via the sensor devices 20, the sensor(s) 404, or the on-die sensor(s) 418.

The contextual data logger 436 may be a part of the data item managing application 424-1. Alternatively, the contextual data logger 436 may be a standalone native application 424. The contextual data logger 436 may operate in the application layer. The contextual data logger may operate in lower layers (e.g., presentation, session, transport, network, data link, and/or physical). The contextual data logger 436 may be integrated into an operating system of the mobile computing device 400. The contextual data logger 436 may operate as a service that the data item managing application 424-1 can subscribe to in order to receive the contextual data 456.

The data item managing application 424-1 manages the data items 472. Managing the data items 472 may refer to receiving the data items 472, storing the data items 472, and/or displaying the data items. As described herein, the data items 472 may be referred to as tasks, and the data item managing application 424-1 may be referred to as a task management application, a to-do list application, and/or a reminders application. The data items 472 may be referred to as knowledge modules or learning modules, and the data item managing application 424-1 may be referred to as a knowledge management application, learning management application, and/or a learning management system. In some implementations, the data item managing application 424-1 may be a part of another native application 424. For example, the data item managing application 424-1 may be a part of a native application 424 that can manage e-mails, calendar events, contact information, and task items.

The data item managing application 424-1 may include a surveyor 428, a data item determiner 432, and a renderer 434. The surveyor 428 can generate surveys, and present the surveys to the user of the mobile computing device 400. A survey can include one or more questions. The user of the mobile computing device 400 can specify responses to the questions in the surveys. The user-specified responses to the questions in the surveys may be referred to as survey data parameters 430. A survey can include a single question, or multiple questions. The surveyor 428 can present surveys periodically (e.g., once a day, once a week, etc.). Alternatively, the surveyor 428 can present a survey when the data item managing application 424-1 is first installed at the mobile computing device 400. See FIG. 5 for examples surveys that the surveyor 428 can generate, and present.

The data item determiner 432 can determine the data items 472. The data item determiner 432 can receive the data items 472 from the server 200 as a push message. The data item determiner 432 can present a graphical user interface (GUI) that allows the user of the mobile computing device 400 to generate a data item 472. The GUI can also accept a search string that the data item determiner 432 can utilize to generate a search query. The data item determiner 472 can transmit the search query to a server (e.g., the server 200, or a search server), and receive the data items 472 as search results. See FIG. 6A-C for example implementations of the data item determiner 432.

The data item managing application 424-1 generates a request 450. The request 450 may be to determine a display order for the data items 472. In other words, the request 450 may be to order the data items 472 based on the contextual data 456. The request 450 can include a device ID 452 that identifies the mobile computing device 400. The request 450 can include a user ID 454 that identifies a user of the mobile computing device 400. The request 450 may include the contextual data 456 from the contextual data store 442. Specifically, the data item managing application 424-1 can include the sensor values 406, the application data parameters 426, and/or the survey data parameters 430 in the request 450. In some implementations, the request 450 may also include the data items 472. In such implementations, the request 450 can include the entirety of the data items 472, or only information that identifies the data items 472 (e.g., data item identifiers (IDs) that identify the data items 472). Upon generating the request 450, the data item managing application 424-1 can transmit the request 450 to the server 200 via the transceiver 420.

The data item managing application 424-1 can generate the request 450 in response to receiving a user input. For example, the data item managing application 424-1 may detect a user selection of a graphical user interface (GUI) element (e.g., a button). In this example, the data item managing application 424-1 can generate, and transmit the request upon detecting the user selection of the GUI element. The user input that triggers the generation, and transmission of the request 450 may include a user input to refresh the data items 472. Alternatively or additionally, the data item managing application 424-1 may generate the request 450 periodically (e.g., once a day, once a week, etc.). Alternatively or additionally, the data item managing application 424-1 may generate the request 450 when the data item managing application 424-1 is launched. For example, the mobile computing device 400 may display an icon for the data item managing application 424-1 (e.g., the icon 425 shown in FIG. 1). Upon detecting a user selection of the icon, the mobile computing device 400 can launch the data item managing application 424-1, and the data item managing application 424-1 can generate and transmit the request 450 upon being launched.

The data item managing application 424-1 may receive an ordered list 470 of the data items 472. The data item managing application 424-1 can receive the ordered list 470 from the server 200. The data item managing application 424-1 can receive the ordered list 470 in response to transmitting the request 450. Alternatively, the ordered list 470 may be pushed to the data item managing application 424-1 without sending with request 450. The ordered list 470 may specify a display order for the data items 472. In other words, the ordered list 470 can specify the order in which the data items 472 are to be displayed at the mobile computing device 400. The ordered list 470 can specify the display order by indicating the score 474 for each data item 472. Higher scores 474 may indicate a higher rank in the display order. For example, if a first score 474-1 of a first data item 472-1 is higher than a second score 474-2 of a second data item 472-1, then the first data item 472-1 ranks higher than the second data item 472-2 in the display order. Accordingly, the first data item 472-1 is displayed above the second data item 472-2 in the list of data items 472. In other words, the first data item 472-1 is displayed towards the top of the list of data items 472, while the second data item 472-2 is displayed towards the bottom of the list of data items 472.

The renderer 434 renders the data items 472 on the touchscreen display 402. For each data item 472, the renderer 434 can display a text string 228, an image 230, a video 232, and/or a link 234 that is associated with the data item 472. The renderer 434 can also display a time duration 238, a popularity, and/or a category 242 for the data item 472. The renderer 434 can utilize the scores 474 of the data items 472 to determine the display order of the data items 472. In other words, the renderer 434 can display the data items 472 based on the scores 474 of the data items 472. For example, the renderer 434 can display the data items 472 such that the data item 472 with the highest score 474 is displayed at the top of the list of data items 472, and the data item 472 with the lowest score 474 is displayed at the bottom of the list of data items 472.

Figure 5:
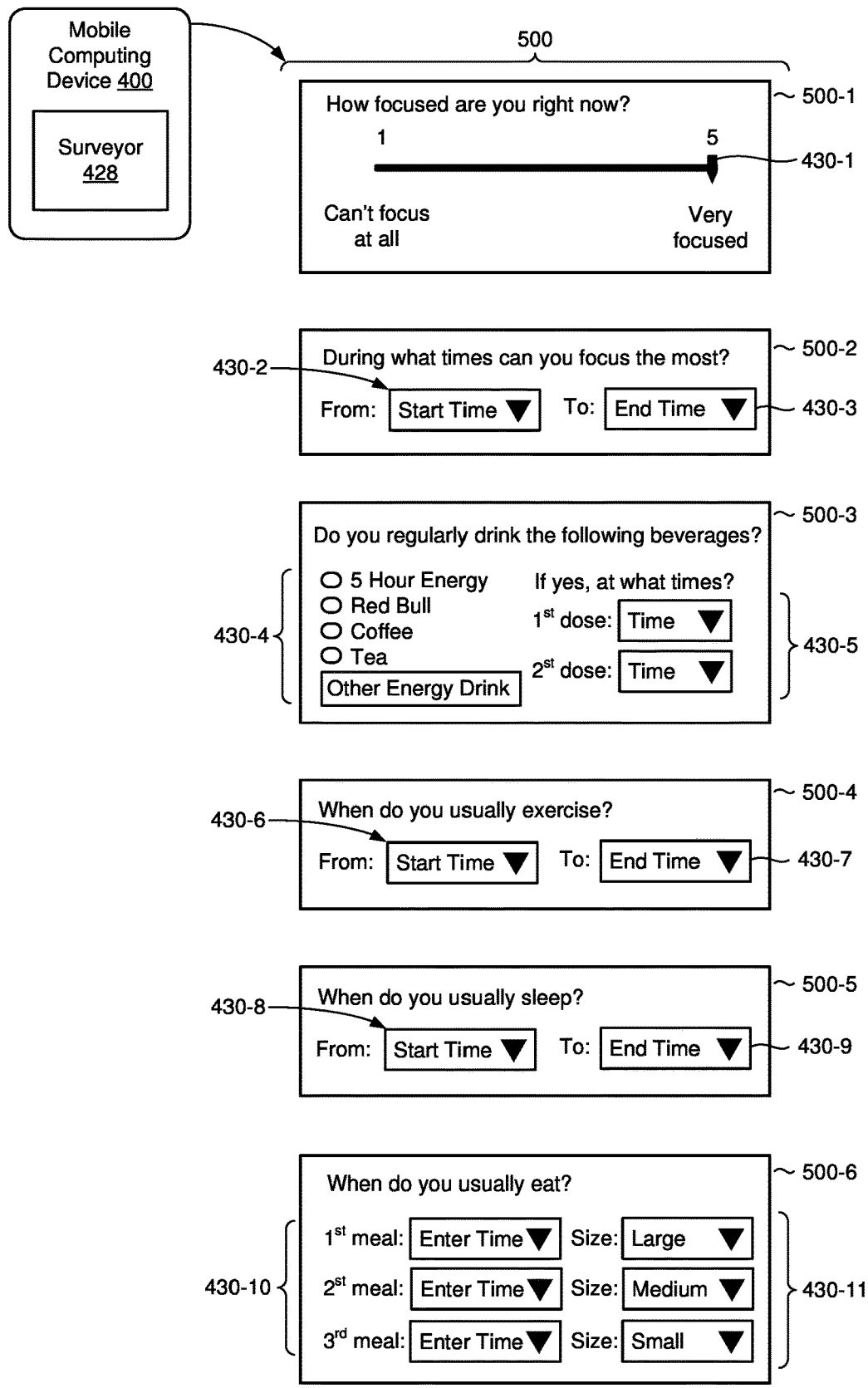
FIG. 5 is a diagram that illustrates example surveys that the mobile computing device can utilize to capture the contextual data.

FIG. 5 illustrates example surveys 500 that the mobile computing device 400 can generate, and present to a user of the mobile computing device 400. Specifically, the surveyor 428 can generate the surveys 500 in order to capture survey data parameters 430. Each survey 500 may include one or more questions that prompt the user of the mobile computing device 400 for an answer. The surveyor 428 can capture the user-specified answer to a question in a survey as a survey data parameter 430. Referring to the first survey 500-1, the surveyor 428 can request the user of the mobile computing device 400 to specify the user's current ability to focus on a scale of 1 to 5. The surveyor 428 can capture the user's response to this question as a first survey data parameter 430-1. In the example of FIG. 5, the user indicated that the user is "very focused". In this example, the server 200 can identify the data items 472 that require a high degree of focus, and rank the identified data items 472 higher in the display order. For example, the server 200 can rank the data items 472 in the cognitively demanding category higher than other data items 472, so that the data items 472 in the cognitively demanding category are displayed towards the top of the list of data items 472.

Referring to the second survey 500-2, the surveyor 428 can request the user to specify the times during which the user can focus the most. The surveyor 428 can capture the start time specified by the user as a second survey data parameter 430-2, and the end time specified by the user as a third survey data parameter 430-3. The mobile computing device 400 can include the second survey data parameter 430-2, and the third survey data parameter 430-3 in the request 450. During the time period indicated by the second survey data parameter 430-2 and the third survey data parameter 430-3, the server 200 can boost the scores 474 for data items 472 that require a relatively high degree of cognition (e.g., brain arousal). For example, the server 200 may score data items 472 in the cognitively demanding category higher than data items 472 in the rote category.

Referring to the third survey 500-3, the surveyor 428 can prompt the user to select a beverage that the user drinks, and specify the times during the day at which the user consumes the selected beverage(s). The surveyor 428 can store the selected beverage(s) as a fourth survey data parameter 430-4, and the time at which the user consumes the beverage as a fifth survey data parameter 430-5. The server 200 can utilize the fourth survey data parameter 430-4 and the fifth survey data parameter 430-5 in determining the display order for the data items 472. The server 200 can estimate the effect of the beverage(s) indicated by the fourth survey data parameter 430-4 on the user's brain. For example, if the fourth survey data parameter 430-4 and the fifth survey data parameter 430-5 indicate that the user regularly consumes a coffee at 3 pm, then the server 200 can boost the scores 474 for data items 472 in the cognitively demanding category by one, and decrease the scores 474 for data items 472 in the rote category by one from 3 pm to 5 pm. In this example, the time period from 3 pm to 5 pm represents a time duration during which the user may be more effective at performing cognitively demanding tasks due to the stimulating effect of coffee on the brain.

In general, the surveyor 428 can prompt the user to specify the name of a stimulant that the user may have consumed, and/or is planning on consuming. The surveyor 428 can also prompt for a quantity of the stimulant. The quantity may be referred to as a dosage level. The surveyor 428 can also prompt for a time at which the user consumed the stimulant, or is planning on consuming the stimulant. Examples of stimulants include ephedrine, amphetamine, and caffeine that may be included in caffeinated beverages (e.g., 5 Hour Energy, Red Bull, coffee, tea, etc.) or caffeine pills. The stimulant can include any substance that tends to increase the electrical activity of the brain.

Referring to the fourth survey 500-4, the surveyor 428 can prompt the user to specify the times during which the user normally exercises. The surveyor 428 can store these times as a sixth survey data parameter 430-6, and a seventh survey data parameter 430-7. The server 200 can utilize the sixth survey data parameter 430-6 and the seventh survey data parameter 430-7 in determining the display order for the data items 472. In some examples, the server 200 can assign higher scores 474 for data items 472 in the mnemonic category than data items 472 in the rote category. After exercising, a user may be more effective at performing tasks that involve memorizing information instead of performing routine tasks. Hence, by assigning higher scores 474 to mnemonic tasks and lower scores 474 to rote tasks, the server 200 can cause the mnemonic tasks to be ranked higher in the display order than rote tasks.

Referring to the fifth survey 500-5, the surveyor 428 can prompt the user to specify the times during which the user normally sleeps. The sleep times can be captured, and sent to the server 200 as the eight survey data parameter 430-8, and the ninth survey data parameter 430-9. The server 200 can utilize the eight survey data parameter 430-8, and the ninth survey data parameter 430-9 in determining the display order for the data items 472. For example, the server 200 can assign higher scores 474 to cognitively demanding tasks and creative tasks after the user wakes up because users may be more effective at such tasks soon after waking up. Similarly, the server 200 can assign higher scores 474 to routine tasks and lower scores 474 to cognitively demanding tasks when the user is about to go to sleep because users may be more effective at routine tasks when they are about to go to sleep.

Referring to the sixth survey 500-6, the surveyor 428 can prompt the user to specify when the user eats meals, and the size of the meals. The surveyor 428 can capture the meal time(s) as a tenth survey data parameter 430-10, and the meal size(s) as an eleventh survey data parameter 430-11. The server 200 can utilize the meal time(s), and the meal size(s) to determine the display order for the data items 472.

For example, a user may be less effective at cognitively demanding tasks and more effective at routine tasks soon after consuming a large meal. In this example, the server 200 can assign higher scores 474 for data items 472 in the rote category, and lower scores 474 for data items 472 in the cognitively demanding category.

Figure 6A:
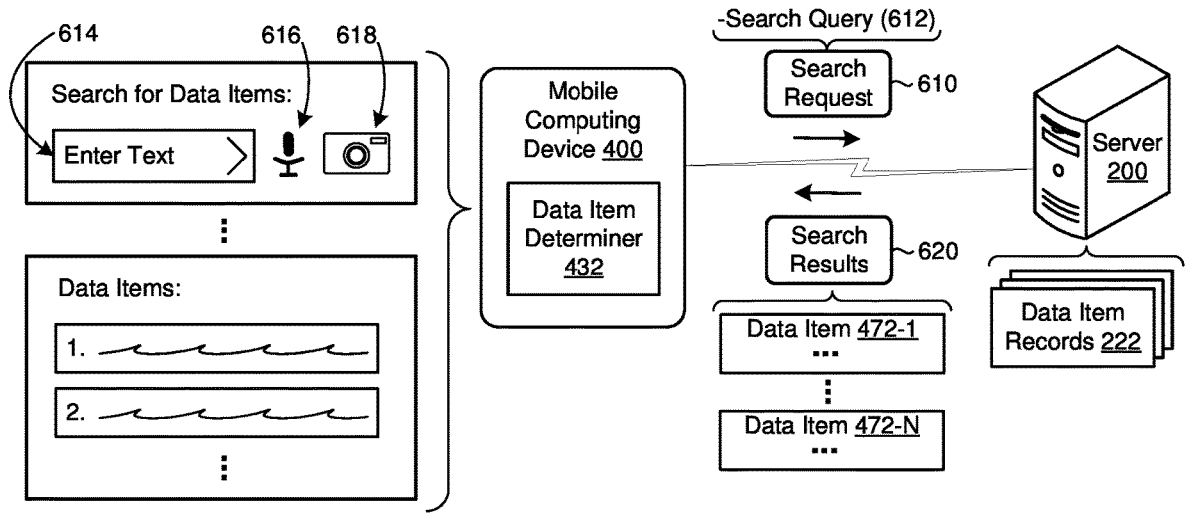
FIG. 6A is a schematic diagram that illustrates that the mobile computing device can receive the data items from a server in response to a search request.

FIG. 6A illustrates an example implementation in which the data item determiner 432 determines the data items 472 by receiving the data items 472 as search results 620 in response to transmitting a search request 610. The mobile computing device 400 may receive a search query 612 via a search box 614 that can accept textual input, an audio input interface 616 that can accept audio input, or an image input interface 618 that can accept an image as an input. Upon receiving the search query 612, the data item determiner 432 can generate the search request 610. The search request 610 can include the search query 612. Upon generating the search request 610, the data item determiner 432 can transmit the search request 610 to a server (e.g., the server 200). The server 200 can identify data item records 222 that may be relevant to the search query 612. The server 200 may utilize various techniques to identify the relevant data item records 222. For example, the server 200 may utilize an inverted index that maps keywords to record IDs 224 that identify the data item records 222. Specifically, the server 200 can query the inverted index with search terms from the search query 612 to identify the relevant data item records 222. Upon identifying the relevant data item records 222, the server 200 can retrieve information regarding the data items 472 from their corresponding data item records 222, and send the information to the mobile computing device 400 as the search results 620. Hence, the data item determiner 432 can receive the data items 472 as search results 620.

Figure 6B:
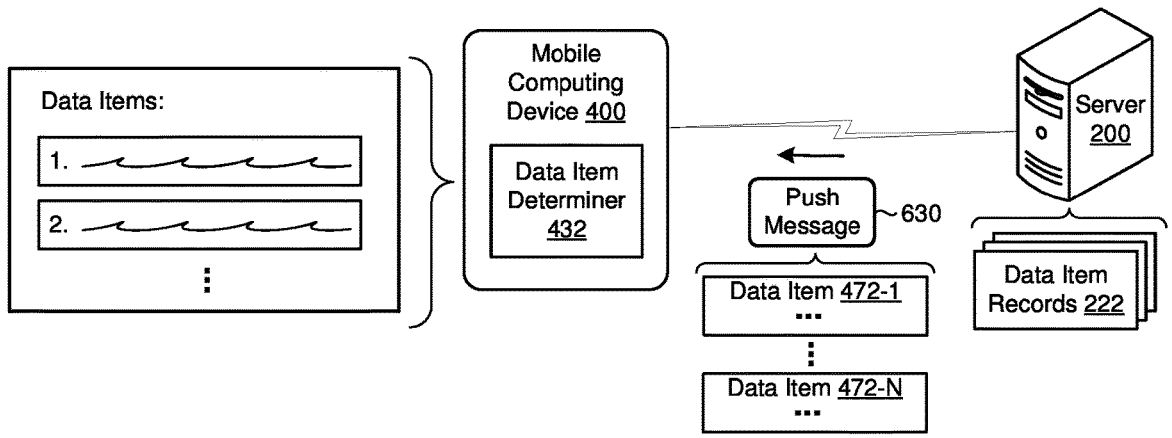
FIG. 6B is a schematic diagram that illustrates that the mobile computing device can receive the data items from a server as a push message.

FIG. 6B illustrates an example implementation in which the data item determiner 432 receives the data items 472 in a push message 630. In contrast to the implementation exemplified in FIG. 6A, the data item determiner 432 receives the data items 472 without explicitly requesting the data items 472. The server 200 may determine which data items 472 are to be pushed to the mobile computing device 400. For example, an administrator may instruct the server 200 to send a particular set of data items 472 to the mobile computing device 400, and the server 200 can send the data items 472 specified by the administrator to the mobile computing device 400.

Figure 6C:
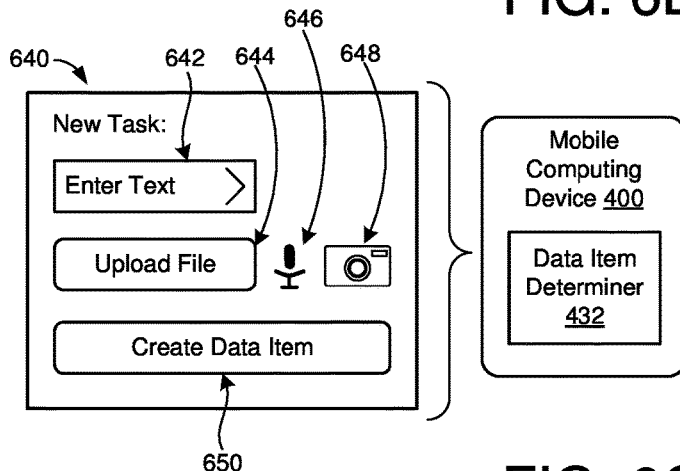
FIG. 6C is a diagram that illustrates that the mobile computing device can display a graphical user interface for generating a data item.

FIG. 6C illustrates an example implementation in which the data item determiner 432 allows the user of the mobile computing device 400 to generate the data item(s) 472 at the mobile computing device 400. The data item determiner 432 can display a data item generation screen 640. The data item generation screen 640 may include various graphical user interface elements that allow the user of the mobile computing device 400 to specify elements of the data item 472 that is being generated. For example, a text box 642 can receive a textual input. A file upload interface 644 can allow the user to upload a file. An audio input interface 646 can receive audio input. An image input interface 648 can receive an image as an input. The data item generation screen 640 may include a submit button 650. Upon detecting a user selection of the submit button 650, the data item determiner 432 can generate a data item 472 based on the information provided by the user via the text box 642, the file upload interface 644, the audio input interface 646, and/or the image input interface 648.

FIG. 7 illustrates an example method 700 for re-arranging the display order of data items based on contextual data. The method 700 may be executed by a mobile computing device (e.g., the mobile computing device 400 shown in FIG. 4). The method 700 may be implemented as a set of computer-readable instructions that are executed by a computing processor (e.g., the computing processor 410 of the mobile computing device 400 shown in FIG. 4). In general, the mobile computing device displays a list of data items (at 710). At 720, the mobile computing device detects a trigger to re-order the data items in the list. The mobile computing device captures contextual data (at 730). At 740, the mobile computing device generates a request to re-order the data items. The mobile computing device transmits the request to a server (at 750). Upon transmitting the request, the mobile computing device receives an ordered list of the data items (at 760). The mobile computing device re-arranges the display of the data items based on the order indicated in the ordered list (at 770).

Referring to 710, the mobile computing device may display an icon for a data item managing application. The data item managing application manages data items. As described herein, the data items may be referred to as tasks, and the data item managing application may be referred to as a task management application, a to-do list application, and/or a reminders application. The mobile computing device may receive a user selection of the icon for the data item managing application (at 712). Upon receiving the user selection of the icon, the mobile computing device can launch the data item managing application (at 714). Launching the data item managing application may include sending an instruction to a kernel of the operating system to start a process for the data item managing application. To start the process, the kernel may allocate memory for bookkeeping and then load the computer-readable instructions that correspond with the data item managing application. Launching the data item managing application may include additional or alternative operations. When the data item managing application launches, the mobile computing device displays the data items via a graphical user interface (GUI) of the data item managing application (at 716).

At 720, the mobile computing device detects a trigger to re-order (e.g., re-arrange) the data items that the data item managing application displays. Re-ordering the data items may refer to re-arranging a display order of the data items. Detecting the trigger to re-arrange the data items may include receiving a user input via the GUI (at 722). For example, the data item managing application can display a user-selectable button, and the trigger to re-order the data items may include detecting a user selection of the button. Alternatively or additionally, detecting the trigger to re-arrange the data items may include launching the data item managing application (at 724). In other words, when the data item managing application is launched, the display order of the data items can be re-arranged. Alternatively or additionally, the display order of the data items can be re-arranged periodically (e.g., once a day, once a week, etc.) (at 726).

At 730, the mobile computing device captures contextual data. The contextual data may indicate a context of the mobile computing device. Capturing the contextual data may include capturing sensor values (at 732), capturing application data parameters (at 734), and/or capturing survey data parameters (at 736). Referring to 732, the mobile computing device may receive sensor values from various sensor devices via short range communications (e.g., Bluetooth, Bluetooth Low Energy, NFC, Wi-Fi, etc.) (at 732-1). For example, the mobile computing device may receive sensor values from the sensor devices 20 shown in FIG. 1. Also, the mobile computing device may utilize sensors that are inside the mobile computing device to record sensor measurements (at 732-2). For example, the mobile computing device may utilize the sensor(s) 404, and/or the on-die sensor(s) 418 shown in FIG. 4.

Referring to 734, the mobile computing device can utilize one or more application programming interfaces (APIs) to retrieve information that may be associated with other devices and/or applications (at 734-1). For example, the mobile computing device can utilize an API to retrieve information regarding the user's food consumption, water consumption, sleep patterns, etc. At 734-2, the mobile computing device may receive application data parameters from other applications that are installed at the mobile computing device.

Referring to 736, the mobile computing device can utilize one or more surveys to collect contextual data. Contextual data that is collected using surveys may be referred to as survey data parameters. At 736-1, the mobile computing device can display one or more surveys. Each survey can include one or more questions that prompt the user for an answer. For example, a survey question can ask the user about the user's caffeine consumption. See FIG. 5 for example surveys. At 736-2, the mobile computing device receives responses to the surveys. The responses can be stored as survey data parameters.

At 740, the mobile computing device generates a request to re-order the data items. Generating the request may include instantiating a data container (at 742). The data container may include a JSON object, an XML file, etc. At 744, the mobile computing device writes the contextual data, that the mobile computing device captured at 730, to the data container. Writing the contextual data may include writing the sensor values, the application data parameters, and/or the survey data parameters. At 746, the mobile computing device may write a user ID and/or a device ID to the data container. The user ID may include a string that identifies a user of the mobile computing device. The device ID may include a string that identifies the mobile computing device. At 748, the mobile computing device may write information regarding the data items to the data container. The mobile computing device may write the entirety of the data items (e.g., a text string, an image, a video, a link, and/or a category associated with the data item). Alternatively, the mobile computing device may only write information that identifies the data items (e.g., data item IDs).

At 750, the mobile computing device transmits the request to a server (e.g., the server 200 shown in FIG. 2A). As described in relation to FIGS. 2A-3B, the server receives the request, and utilizes the contextual data specified in the request to determine a display order for the data items associated with the mobile computing device. Upon determining the display order for the data items, the server can indicate the display order to the mobile computing by sending an ordered list of data items.

At 760, the mobile computing device receives a display order for the data items. Receiving the display order may include receiving an ordered list of the data items, and the ordered list may indicate the display order for the data items. Receiving the ordered list may include receiving a data container (at 762). The data container may include information regarding the data items. In some implementations, the data container may include the entirety of the data items. For example, the data container may include text strings, images, videos, and/or links that are associated with the data items. Alternatively, the data container may only include information that identifies the data items. For example, the data container may include data item IDs that identify the data items that are stored at the mobile computing device.

Receiving the display order of the data items may include receiving scores for the data items (at 764). The score for a data item can indicate the rank of the data item in the display order. For example, a data item with a score of 0.9 can be placed above a data item with a score of 0.5.

At 770, the mobile computing device re-arranges the display of the data items based on the display order received at 760. For example, the mobile computing device can re-arrange the data items such that the data items are arranged based on descending scores (at 772). In other words, the data items with relatively high scores appear towards the top of the list, and data items with relatively low scores appear towards the bottom of the list. Put another way, the data item with the highest score appears at the top of the list, and the data item with the lowest score appears at the bottom of the list.

If multiple data items have the same score, then the mobile computing device may utilize additional information to determine the order of such data items (at 774). The mobile computing device can arrange data items with the same score based on a time duration associated with the data items (at 774-1). For example, the data item with the shorter time duration can be placed above the data item with the longer time duration. The mobile computing device can arrange data items with the same score based on a size of the data items (at 774-2). For example, the smaller data item can be placed above the larger data item. The mobile computing device can arrange data items with the same score based on the length of a string in the data item (at 774-3). For example, the data item with the smaller string can be placed above the data item with the longer string.

The mobile computing device can arrange data items with the same score based on calendar availability (at 774-4). The mobile computing device can determine a start time of the next calendar event stored in a calendar application that is installed at the mobile computing device. The mobile computing device can calculate an available time by computing a time difference between a current time, and the start time of the next calendar event. Data items that are associated with a time duration that is less than the available time can be placed above the data items that are associated with a time duration that is greater than the available time.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:
1. A method comprising:
at a mobile computing device comprising one or more processors, a short-range communications interface, a non-transitory memory and a display:
receiving, via a learning management application, a request to display a learning module including multimedia content that provides information regarding a subject;
receiving, via the short-range communications interface, sensor values from a set of one or more sensor devices attached to a patient;
displaying, on the display, a set of one or more survey questions;
in response to displaying the set of one or more survey questions, receiving user-specified responses to the set of one or more survey questions;
selecting, by the learning management application, a first learning module from a plurality of learning modules based on the sensor values received from the sensor devices attached to the patient, the user-specified responses to the set of one or more survey questions, a time duration of the first learning module and an amount of time available to the patient before an upcoming calendar event indicated by calendar application data; and
displaying, by the learning management application, multimedia content including a combination of a text string, an image, a video and a user-selectable link stored in the first learning module on the display in response to receiving the request to display the learning module.
2. The method of claim 1, wherein the set of one or more survey questions relate to a dietary intake of the patient;
wherein the set of one or more sensor devices includes a blood glucose monitor and an insulin pump; and wherein the sensor values include a blood glucose measurement detected by the blood glucose monitor and an amount of insulin administered to the patient by the insulin pump.

3. The method of claim 1, wherein the set of one or more survey questions relate to an exercise routine of the patient.

4. The method of claim 1, wherein the set of one or more survey questions relate to a sleep schedule of the patient.

5. The method of claim 1, wherein the set of one or more sensor devices includes a wearable computing device that detects the sensor values and transmits the sensor values to the mobile computing device.

6. The method of claim 1, wherein the set of one or more sensor devices includes a heart rate monitor and the sensor values include a heart rate measurement detected by the heart rate monitor.

7. The method of claim 1, wherein the set of one or more sensor devices includes a blood glucose monitor and the sensor values include a blood glucose measurement detected by the blood glucose monitor.

8. The method of claim 1, wherein displaying the first learning module comprises:
displaying a list that includes at least a subset of the plurality of the learning modules; and
displaying the first learning module at a top of the list.

9. The method of claim 1, wherein selecting the first learning modules comprises:
determining respective relevance scores for the plurality of learning modules based on the sensor values and the user-specified responses to the set of one or more survey questions; and
selecting the first learning module from the plurality of learning modules in response to a first relevance score of the first learning module being greater than a remainder of the respective relevance scores for the plurality of learning modules.

10. A mobile computing device comprising:
one or more processors;
a non-transitory memory;
a short-range communications interface;
a display; and
one or more programs stored in the non-transitory memory, which, when executed by the one or more processors, cause the mobile computing device to:
receive, via a learning management application, a request to display a learning module including multimedia content that provides information regarding a subject;
receive, via the short-range communications interface, sensor values from a set of one or more sensor devices attached to a patient;
display, on the display, a set of one or more survey questions;
in response to displaying the set of one or more survey questions, receive user-specified responses to the set of one or more survey questions;
select, by the learning management application, a first learning module from a plurality of learning modules based on the sensor values received from the sensor devices attached to the patient, the user-specified responses to the set of one or more survey questions, a time duration of the first learning module and an amount of time available to the patient before an upcoming calendar event indicated by calendar application data; and
display, by the learning management application, multimedia content including a combination of a text string, an image, a video and a user-selectable link stored in the first learning module on the display in response to receiving the request to display the learning module.

11. The mobile computing device of claim 10, wherein the set of one or more survey questions relate to a dietary intake of the patient;
wherein the set of one or more sensor devices includes a blood glucose monitor and an insulin pump; and
wherein the sensor values include a blood glucose measurement detected by the blood glucose monitor and an amount of insulin administered to the patient by the insulin pump.

12. The mobile computing device of claim 10, wherein the set of one or more survey questions relate to an exercise routine of the patient.

13. The mobile computing device of claim 10, wherein the set of one or more survey questions relate to a sleep schedule of the patient.

14. The mobile computing device of claim 10, wherein the set of one or more sensor devices includes a wearable computing device that detects the sensor values and transmits the sensor values to the mobile computing device.

15. The mobile computing device of claim 10, wherein the set of one or more sensor devices includes a heart rate monitor and the sensor values include a heart rate measurement detected by the heart rate monitor.

16. The mobile computing device of claim 10, wherein the set of one or more sensor devices includes a blood glucose monitor and the sensor values include a blood glucose measurement detected by the blood glucose monitor.

17. The mobile computing device of claim 10, wherein displaying the first learning module comprises:
displaying a list that includes at least a subset of the plurality of the learning modules; and
displaying the first learning module at a top of the list.

18. The mobile computing device of claim 10, wherein selecting the first learning module comprises:
determining respective relevance scores for the plurality of learning modules based on the sensor values and the user-specified responses to the set of one or more survey questions; and
selecting the first learning module from the plurality of learning modules in response to a first relevance score of the first learning module being greater than a remainder of the respective relevance scores for the plurality of learning modules.

19. A non-transitory memory storing one or more programs, which, when executed by one or more processors of a mobile computing device with a display and a short-range communications interface, cause the mobile computing device to:
receive, via a learning management application, a request to display a learning module including multimedia content that provides information regarding a subject;
receive, via the short-range communications interface, sensor values from a set of one or more sensor devices attached to a patient;
display, on the display, a set of one or more survey questions;
in response to displaying the set of one or more survey questions, receive user-specified responses to the set of one or more survey questions;
select, by the learning management application, a first learning module from a plurality of learning modules based on the sensor values received from the sensor devices attached to the patient, the user-specified responses to the set of one or more survey questions, a time duration of the first learning module and an amount of time available to the patient before an upcoming calendar event indicated by calendar application data; and display, by the learning management application, multimedia content including a combination of a text string, an image, a video and a user-selectable link stored in the first learning module on the display in response to receiving the request to display the learning module.

20. The non-transitory memory of claim 19, wherein the set of one or more survey questions relate to a dietary intake of the patient;

wherein the set of one or more sensor devices includes a blood glucose monitor and an insulin pump; and wherein the sensor values include a blood glucose measurement detected by the blood glucose monitor and an amount of insulin administered to the patient by the insulin pump.

* * * * *